(12) United States Patent
Cai et al.

(10) Patent No.: US 9,464,744 B2
(45) Date of Patent: *Oct. 11, 2016

(54) LEAKAGE-PROOF PIPE FITTING OF QUICK CONNECTION FOR REVERSE OSMOSIS MEMBRANE (RO) WATER TREATMENT UNIT OF HOUSEHOLD

(76) Inventors: Ying Lin Cai, Guangdong (CN); Chao Fou Hsu, Kaohsiung (TW)

( * ) Notice: Subject to any disclaimer, the term of this patent is extended or adjusted under 35 U.S.C. 154(b) by 1010 days.

This patent is subject to a terminal disclaimer.

(21) Appl. No.: 13/588,219

(22) Filed: Aug. 17, 2012

(65) Prior Publication Data

US 2013/0320667 A1 Dec. 5, 2013

(30) Foreign Application Priority Data

Jun. 4, 2012 (TW) .............................. 101119893 A

(51) Int. Cl.
*F16L 37/091* (2006.01)
*F16L 37/092* (2006.01)

(52) U.S. Cl.
CPC .................................. *F16L 37/0925* (2013.01)

(58) Field of Classification Search
USPC .................................. 285/243, 319, 322–323
See application file for complete search history.

(56) References Cited

U.S. PATENT DOCUMENTS

| 4,637,636 A * | 1/1987 | Guest ................... F16L 37/0925 |
| | | 285/179 |
| 4,712,810 A | 12/1987 | Pozzi |
| 4,736,968 A | 4/1988 | Glegg |
| 5,201,213 A | 4/1993 | Henning |
| 6,019,348 A | 2/2000 | Powell |
| 7,419,191 B2 | 9/2008 | Shu |

* cited by examiner

*Primary Examiner* — Aaron Dunwoody
*Assistant Examiner* — Fannie Kee
(74) *Attorney, Agent, or Firm* — Bacon & Thomas, LLC

(57) ABSTRACT

A leakage-proof pipe fitting of quick connection for a Reverse Osmosis Membrane (RO) household water treatment unit comprises a pipe fitting, a sealing O-ring, an annular cooperative bushing collar, an accessory latching clip and an adapted cylindrical elastic sleeving collet with an elongated annular delimiting flange, whose longitudinal thickness is lengthened into at least a double length for the original longitudinal thickness of the conventional annular delimiting flange to extend the embracing distance from the top surface of the adapted cylindrical elastic sleeving collet to the bottom surface of a cylindrical retainer in the pipe fitting so that the curvature for the bent water pipe/tube covered by the embracing distance is reduced.

4 Claims, 25 Drawing Sheets

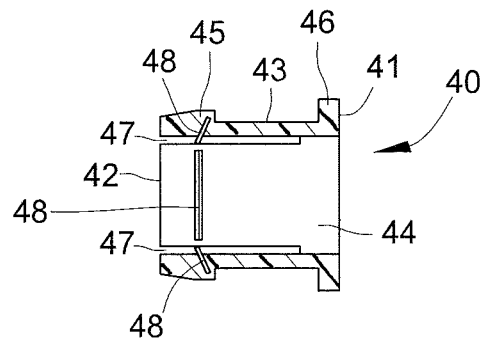
FIG.5 (PRIOR ART)
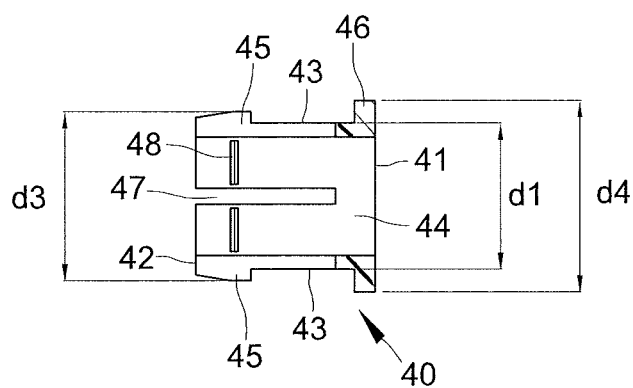
FIG.6 (PRIOR ART)
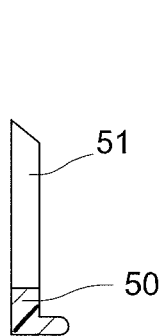 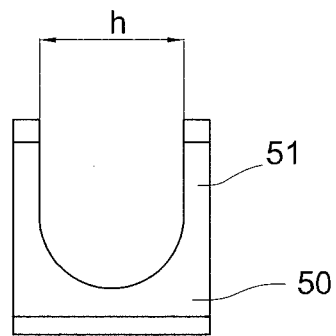
FIG.7 (PRIOR ART)    FIG.8 (PRIOR ART)

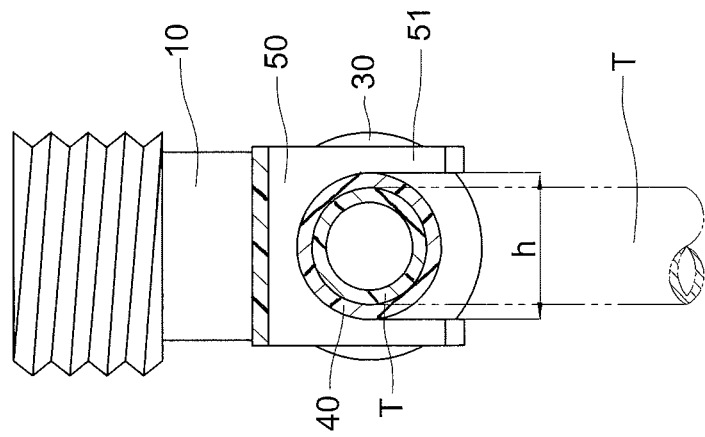
FIG. 19 (PRIOR ART)
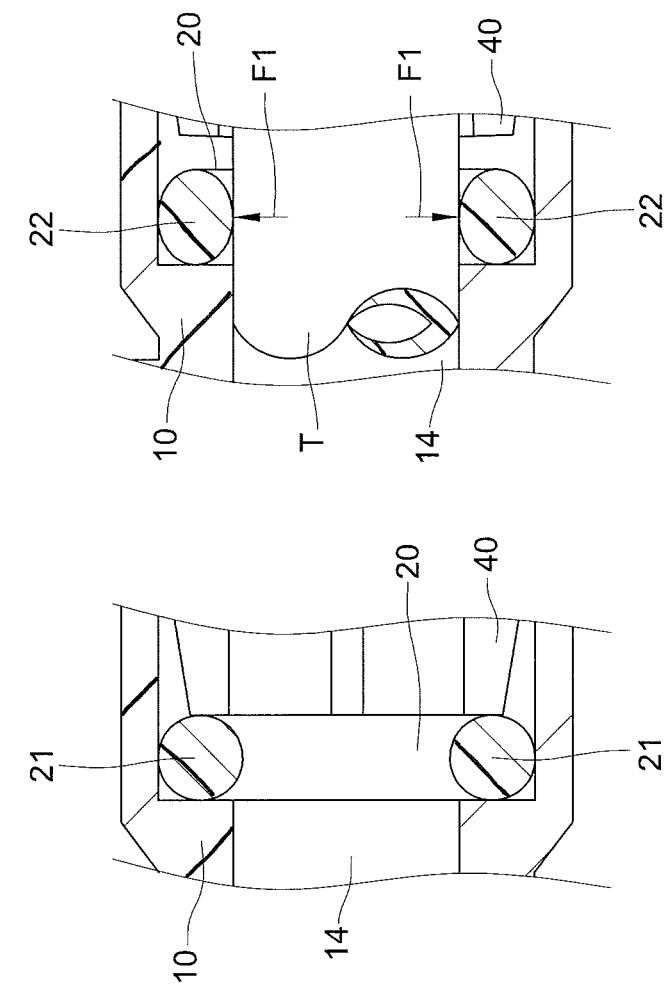
FIG. 15-a (PRIOR ART)
FIG. 14-a (PRIOR ART)

FIG.18-a (PRIOR ART)

LEAKAGE-PROOF PIPE FITTING OF QUICK CONNECTION FOR REVERSE OSMOSIS MEMBRANE (RO) WATER TREATMENT UNIT OF HOUSEHOLD

FIELD OF THE PRESENT INVENTION

The present invention relates to a "leakage-proof pipe fitting of quick connection" for Reverse Osmosis Membrane (RO) water treatment unit of household, particularly for a leakage-resistant device for the plumbing pipe/tube fitting of inserting type with quick connection. Even if the water pipe/tube is badly bent, the long-lasting leakage-free effect for the pipe fitting still can ensure that no compressed water leaks out. Therefore, it has real effect to prevent the RO water treatment unit from the leakage of compressed water therein due to water pipe/tube having been bent for a long-term.

BACKGROUND OF THE INVENTION

Owing to people pay much attention to the drinking water of daily life, the purchasing rate for the Reverse Osmosis Membrane (RO) water treatment unit of household is constantly soaring. As a result, the selling volume in the market is directly reflected in increasing manner. Accordingly, for the purpose of increasing production quantity and decreasing assembly laboring cost, manufacturers of the RO water treatment unit convert the traditional tube/pipe fittings of threaded type with much more labor hours in the plumbing task into tube/pipe fittings of inserting type with less labor hours in the plumbing task. According to current status, the plumbing task for the tube/pipe fittings of threaded type takes three seconds while the plumbing task for the tube/pipe fittings of inserting type only takes one second. Thus, the labor hours for the former is triple of the labor hours for the later.

The structure of the conventional tube/pipe fittings of inserting type is shown as in the FIGS. 1 through 8, which comprises a pipe fitting of elbow type 10, a sealing O-ring 20, an annular cooperative bushing collar 30, a cylindrical elastic sleeving collet 40 and an accessory latching clip 50 with a cantilevered lug, wherein:

Said pipe fitting of elbow type 10, which is unitarily extruded in one piece by plastics molding into tubular L-shaped fitting with two coupling unions 11 (FIG. 2) or tubular T-shaped fitting with three coupling unions 11 (FIG. 3), includes a hollow water passage 12, a cylindrical retainer 13 and a cylindrical docking receptacle 14 such that one coupling union 11 encloses the cylindrical retainer 13 therein while the circumferences of the rest coupling unions 11 have male threads formed thereon, and the cylindrical docking receptacle 14 runs through the cylindrical retainer 13 in communicable with the hollow water passage 12;

Said sealing O-ring 20 is made of rubber to be inserted against the inner bottom wall of the cylindrical retainer 13 in the pipe fitting of elbow type 10 such that whose outer diameter equals the inner diameter of the cylindrical retainer 13 in the pipe fitting of elbow type 10 while whose inner diameter is slightly less than the inner diameter of the cylindrical docking receptacle 14 in the pipe fitting of elbow type 10;

Said annular cooperative bushing collar 30, which is unitarily extruded in one piece by plastics molding into two-stair tiered hollow cylinder to be partially slid into the coupling union 11 on the cylindrical retainer 13 of the pipe fitting of elbow type 10 by means of glue-bonding or high frequency melt-bonding method, includes a top surface 31, a bottom surface 32, a jointing circular through-hole 33 running through the top surface 31 and bottom surface 32, and a guiding conical flare 34 respectively created along each rim of the top surface 31 and bottom surface 32 such that the outer diameter of top stair rim abutting top surface 31 is greater than the outer diameter of bottom stair rim abutting bottom surface 32 (FIG. 4);

Said cylindrical elastic sleeving collet 40, which is unitarily extruded in one piece by plastics molding into hollow cylinder to be slid into the jointing circular through-hole 33 of the annular cooperative bushing collar 30, includes a peripheral gorgerin 43 integrating a top surface 41 and a bottom surface 42 with a circular sliding through hole 44 running through therein, an annular cambered locking flange 45 abutting the bottom surface 42 and an annular delimiting flange 46 abutting the top surface 41 as well as a plurality of longitudinal hooping slits 47 of circumferentially equivalent-space created along the bottom surface 42 towards the top surface 41 to be communicable with the circular sliding through hole 44, and a plurality of elastic griping ribs 48 of circumferentially equivalent-space created between two adjacent longitudinal hooping slit 47, wherein the outer diameter d1 of the peripheral gorgerin 43 is smaller than the inner diameter d2 of the jointing circular through-hole 33 in the annular cooperative bushing collar 30, the outer diameter d3 of the annular cambered locking flange 45 is greater than the inner diameter d2 of the jointing circular through-hole 33 in the annular cooperative bushing collar 30 and the outer diameter d4 of the annular delimiting flange 46 is greater than the inner diameter d3 of the annular cambered locking flange 45 (FIGS. 4 and 6); and Said accessory latching clip 50, which is unitarily extruded in one piece by plastics molding into planiform collar to be served as clamping means for assembled pipe fitting, includes a U-shaped nick 51 with two prongs of straight legs encompassing central cut nick such that the width h between two legs of the U-shaped nick 51 is slightly greater than the outer diameter d1 of the peripheral gorgerin 43 in the cylindrical elastic sleeving collet 40 (FIG. 8).

Please further refer to FIGS. 9 through 13. The assembling steps of the foregoing conventional tube/pipe fittings of inserting type are shown as below.

a. Insert the sealing O-ring 20 into the cylindrical retainer 13 in the pipe fitting of elbow type 10 to the thorough end such that the sealing O-ring 20 contacts against the inner bottom wall of the cylindrical retainer 13 (FIGS. 10 and 11).

b. Facing the bottom surface 32 of the annular cooperative bushing collar 30 towards the cylindrical retainer 13 of the pipe fitting of elbow type 10, insert the annular cooperative bushing collar 30 into the cylindrical retainer 13 of the pipe fitting of elbow type 10 (FIG. 11), then securely fix the annular cooperative bushing collar 30 onto the coupling union 11 of the pipe fitting of elbow type 10 by means of glue-bonding or high frequency melt-bonding method (FIG. 12).

c. Facing the bottom surface 42 of the cylindrical elastic sleeving collet 40 towards the jointing circular through-hole 33 of the annular cooperative bushing collar 30, forcibly push the annular cambered locking flange 45 of the cylindrical elastic sleeving collet 40 forwardly to pass it through the jointing circular through-hole 33 of the annular cooperative bushing collar 30 to finish the assembly of the conventional tube/pipe fittings of inserting type (FIGS. 9 and 13). At this moment, a clearance G1 is created because the outer diameter d1 of the peripheral gorgerin 43 in the cylindrical elastic sleeving collet 40 is less than the inner diameter d2 of the jointing circular through-hole 33 in the annular cooperative bushing collar 30 (FIG. 13 and associated partially magnified view) so that the cylindrical elastic sleeving collet 40 is free to move to and fro in the jointing circular through-hole 33 of the annular cooperative bushing collar 30 without possibility for the cylindrical elastic sleeving collet 40 being slipped out of the annular cooperative bushing collar 30 under the confinement of the annular cambered locking flange 45 because the outer diameter d3 of the annular cambered locking flange 45 in the cylindrical elastic sleeving collet 40 is greater than the inner diameter d2 of the jointing circular through-hole 33 in the annular cooperative bushing collar 30.

Please refer to FIGS. 14 through 18, 14-a and 15-a. The mutually jointing steps between the foregoing conventional tube/pipe fittings of inserting type and the water tube/pipe are shown as below.

A. Align and insert a water tube/pipe T into the circular sliding through hole 44 in the top surface 41 of the cylindrical elastic sleeving collet 40 (FIG. 14), then force the water tube/pipe T orderly pass through the circular sliding through hole 44 of the cylindrical elastic sleeving collet 40 and the inner bore of the sealing O-ring 20 up to the cylindrical docking receptacle 14 of the pipe fitting of elbow type 10 (FIG. 15). At this moment, the water tube/pipe T is firmly sleeved by the elastic griping ribs 48 of the circular sliding through hole 44 in the cylindrical elastic sleeving collet 40, and the sealing O-ring 20 is under symmetrically isometric deformed by the compressing force F1 caused by the outer wall of the water tube/pipe T so that a leakage-free effect due to close contact between the water tube/pipe T and the cylindrical docking receptacle 14 of the pipe fitting of elbow type 10 is created, wherein (FIG. 15-a) is a cross sectional view showing a symmetrically isometric deformation 22 of the sealing O-ring 20, which becomes oval shape, while (FIG. 14-a) is a cross sectional view showing no symmetrically isometric deformation 21 of the sealing O-ring 20, which is round shape.

B. hold exposed section of the water tube/pipe T outside of the cylindrical elastic sleeving collet 40, then pull it outwards along the top surface 41 of the cylindrical elastic sleeving collet 40 so that the cylindrical elastic sleeving collet 40 with annular delimiting flange 46 is simultaneously drawn outwards with a certain displacement due to securely clamping of the cylindrical elastic sleeving collet 40 onto the outer wall of the water tube/pipe T (FIG. 16). At this moment, the annular cambered locking flange 45 of the cylindrical elastic sleeving collet 40 is forced to glide into the guiding conical flare 34 of bottom stair rim abutting bottom surface 32 of the jointing circular through-hole 33 in the annular cooperative bushing collar 30 so that an enhanced clamping action of the cylindrical elastic sleeving collet 40 onto the outer wall of the water tube/pipe T is obtained because the annular cambered locking flange 45 is inwardly squeezed by the guiding conical flare 34. Thereby, the outwardly drawn annular delimiting flange 46 detaches off the annular cooperative bushing collar 30 to create a clearance G against the top surface 31 of the annular cooperative bushing collar 30 with same displacement as that of the cylindrical elastic sleeving collet 40 (FIG. 16 and associated partially magnified view).

C. Align the U-shaped nick 51 of the accessory latching clip 50 with the clearance G between the annular delimiting flange 46 of the cylindrical elastic sleeving collet 40 and the top surface 31 of the annular cooperative bushing collar 30, then thoroughly inset the accessory latching clip 50 up to the inner hemispherical bottom of the U-shaped nick 51 contacts against the peripheral gorgerin 43 of the cylindrical elastic sleeving collet 40 so that the cylindrical elastic sleeving collet 40 is tightly fixed in stable manner with no moving possibility to complete the mutually jointing procedure between the foregoing conventional tube/pipe fittings of inserting type and the water tube/pipe T (FIG. 17).

Please further refer to FIGS. 18, 19, 14-a, 15-a and 18-a. Because all parts related to Reverse Osmosis Membrane (RO) water treatment unit such as filter cartridge, Reverse Osmosis Membrane (RO) tube, plumbing fitting, plumbing tubes and so on must be mounted nearby the RO water treatment unit so that the spaces among all these parts must be closely arranged with bending water tube/pipe to effectively employ limited space confined by the RO water treatment unit.

If the water pipe/tube T is bent towards the opening of the U-shaped nick 51 in the accessory latching clip 50 by a bending force Fc (FIGS. 18 and 19), the annular delimiting flange 46 of the cylindrical elastic sleeving collet 40 is borne uneven stress from the water pipe/tube T, namely a partial section of the annular delimiting flange 46, which is corresponding to the opening of the U-shaped nick 51, will lose support from the accessory latching clip 50 and result in no counteraction to the bending force Fc. Accordingly, the peripheral gorgerin 43 is also borne uneven stress from the water pipe/tube T with result that a partial section of the peripheral gorgerin 43 in corresponding to the arrowhead of bending force Fc will closely contact with the inner wall of the jointing circular through-hole 33 while another partial section of the peripheral gorgerin 43 in opposed to the arrowhead of bending force Fc will detach the inner wall of the jointing circular through-hole 33 to create a gap G2 (FIG. 18 and associated partially magnified view). Thereby, due to the bent water pipe/tube T, the deformation of the sealing O-ring 20 will be changed from original symmetrically isometric deformation 22 (FIG. 15-a) into undesired asymmetrically non-isometric deformation 23, 24 (FIG. 18-a).

In other words, the deformation of a partial section of the sealing O-ring 20 in corresponding to the arrowhead of bending force Fc will be increased as shown in asymmetrically non-isometric deformation 23 (FIG. 18-a) while the deformation of another partial section of the sealing O-ring 20 in opposed to the arrowhead of bending force Fc will be decreased as shown in asymmetrically non-isometric deformation 24 (FIG. 18-a). Thus, the sealing effect of the sealing O-ring 20 over the outer wall of the water pipe/tube T becomes defectively uneven. For comparison of sealing effect in efficiency order, the asymmetrically non-isometric deformation 23 is better than the symmetrically isometric deformation 22 while the symmetrically isometric deformation 22 is better than the asymmetrically non-isometric deformation 24. Under normal water pressure of exceeding 80 psi in the water pipe/tube T of general RO water treatment unit with degraded plastics parts from aging effect incurred by the hot expansion and cold shrinkage of the seasonal temperature fluctuation, the compressed water P in the water pipe/tube T will seep out via partial section of bad sealing effect between the outer wall of the water pipe/tube T and the bad deformation of the sealing O-ring 20 like the asymmetrically non-isometric deformation 24 in FIG. 18-a. Consequently, the seeping compressed water P will leak out of the cylindrical elastic sleeving collet 40 via the circular sliding through hole 44 of the cylindrical elastic sleeving collet 40 and gradually spread over the circuit cabling or compressed pump of the RO water treatment unit to damage the overall RO water treatment unit into functionless manner, or even worse to cause safety accident due to electric leakage. All such serious results are incurred by the leakage drawback in the water pipe/tube fitting of quick connection. Therefore, how to solve the leakage drawback in the water pipe/tube fitting of quick connection becomes an urgent issue for the manufacturers of the RO water treatment unit.

SUMMARY OF THE INVENTION

The primary object of the present invention is to provide a leakage-proof pipe fitting of quick connection for Reverse Osmosis Membrane (RO) water treatment unit of household comprises a pipe fitting of elbow type, a sealing O-ring, an annular cooperative bushing collar, an accessory latching clip and an adapted cylindrical elastic sleeving collet with an elongated annular delimiting flange, whose longitudinal thickness is lengthened into at least double length for the original longitudinal thickness of the conventional annular delimiting flange to extend the embracing distance from the top surface of the adapted cylindrical elastic sleeving collet to the bottom surface of the cylindrical retainer in the pipe fitting of elbow type so that the curvature for the bent water pipe/tube covered by the embracing distance is reduced with results in that the sealing O-ring is free from uneven stress of the water pipe/tube. Consequently, it has substantial effect to prevent the RO water treatment unit from the leakage issue of compressed water therein due to water pipe/tube having been bent for a long-term.

The other object of the present invention is to provide a leakage-proof pipe fitting of quick connection for Reverse Osmosis Membrane (RO) water treatment unit of household comprises an adapted accessory latching clip, which includes an adapted U-shaped nick with two prongs of curved legs encompassing central nick such that an outcurved knee bulge configured by two outcurved knees has a maximal width of outcurved knee bulge, while an incurved toe gap configured by two incurved toes has a minimal width of incurved toe gap, which is less than the outer diameter of the peripheral gorgerin in the cylindrical elastic sleeving collet. Therefore, it also has real effect to prevent the RO water treatment unit from the leakage issue of compressed water therein due to water pipe/tube having been bent for a long-term.

BRIEF DESCRIPTION OF THE DRAWINGS

FIG. 4 is a cross sectional view taken from the 4-4 section line of previous FIG. 1 for showing an annular cooperative bushing collar.

FIG. 5 is a cross sectional view taken from the 5-5 section line of previous FIG. 1 for showing a cylindrical elastic sleeving collet.

FIG. 6 is a cross sectional view taken from the 6-6 section line of previous FIG. 1 for showing the cylindrical elastic sleeving collet.

FIG. 7 is a cross sectional view taken from the 7-7 section line of previous FIG. 1 for showing an accessory latching clip.

FIG. 8 is a frontal view for showing the accessory latching clip in the conventional tube/pipe fitting of elbow inserting type.

FIG. 14-*a* is a cross sectional view showing the morphological status of sealing O-ring in a conventional tube/pipe fitting of elbow inserting type before being deformed by compressing force.

FIG. 15-*a* is a cross sectional view showing the morphological status of sealing O-ring in a conventional tube/pipe fitting of elbow inserting type after being deformed by compressing force.

FIG. 18-*a* is a cross section schematic view showing the morphological status of coupled water tube/pipe in a conventional tube/pipe fitting of elbow inserting type with leakage of compressed water therein after being deformed by bending force.

DETAILED DESCRIPTION OF THE PREFERRED EMBODIMENTS

Figure 24:
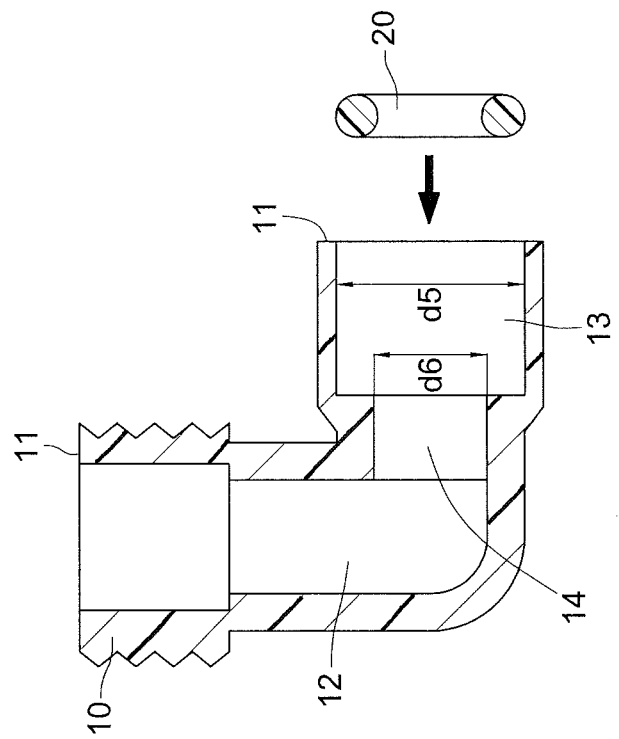
FIG. 24 is the first assembly view for a tube/pipe fitting of elbow inserting type in the first preferred exemplary embodiment of the present invention.
Figure 23:
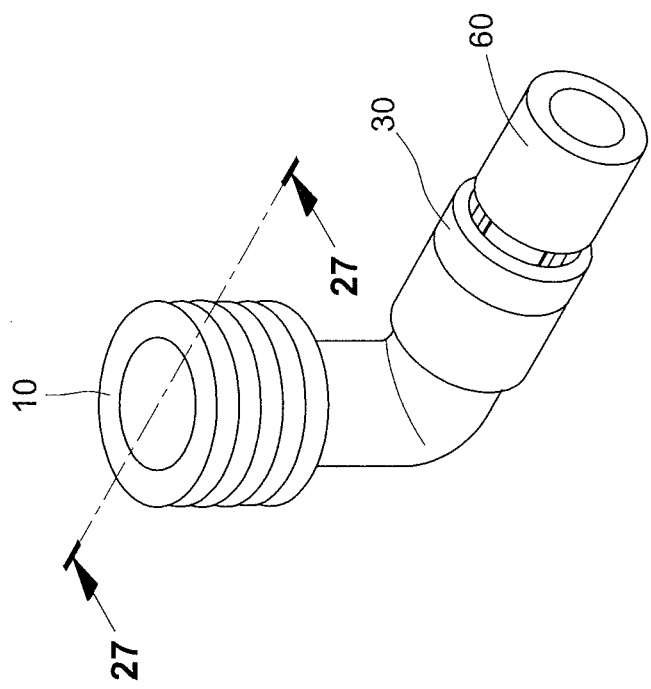
FIG. 23 is a perspective assembly view for a tube/pipe fitting of elbow inserting type in the first preferred exemplary embodiment of the present invention.
Figure 25:
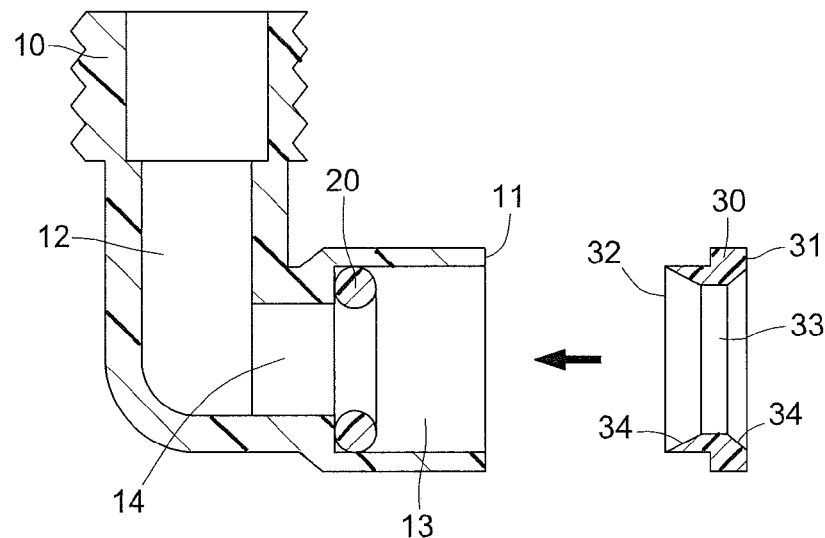
FIG. 25 is the second assembly view for a tube/pipe fitting of elbow inserting type in the first preferred exemplary embodiment of the present invention.

Please refer to FIGS. 20 through 22, 24, 4, 7 and 8. The "leakage-proof pipe fitting of quick connection" for Reverse Osmosis Membrane (RO) water treatment unit of household in the first preferred exemplary embodiment of the present invention comprises a pipe fitting of elbow type 10, a sealing O-ring 20, an annular cooperative bushing collar 30, an adapted cylindrical elastic sleeving collet and an accessory latching clip 50 with a cantilevered lug, wherein:

Said pipe fitting of elbow type 10, which is unitarily extruded in one piece by plastics molding into tubular L-shaped fitting with two coupling unions 11, includes a hollow water passage 12, a cylindrical retainer 13 and a cylindrical docking receptacle 14 such that one coupling union 11 encloses the cylindrical retainer 13 therein, and the cylindrical docking receptacle 14 runs through the cylindrical retainer 13 in communicable with the hollow water passage 12, wherein the inner diameter d5 of the cylindrical retainer 13 is greater than the aperture d6 of the cylindrical docking receptacle 14 (FIG. 24);

Said sealing O-ring 20 is made of rubber to be inserted against the inner bottom wall of the cylindrical retainer 13 in the pipe fitting of elbow type 10 such that whose outer diameter is equivalent to or slightly greater than the inner diameter of the cylindrical retainer 13 in the pipe fitting of elbow type 10 while whose inner diameter is slightly less than the inner diameter of the cylindrical docking receptacle 14 in the pipe fitting of elbow type 10 (FIG. 25);

Said annular cooperative bushing collar 30, which is unitarily extruded in one piece by plastics molding into two-stair tiered hollow cylinder to be partially slid into the coupling union 11 on the cylindrical retainer 13 of the pipe fitting of elbow type 10 by means of glue-bonding or high frequency melt-bonding method, includes a top surface 31, a bottom surface 32, a jointing circular through-hole 33 running through the top surface 31 and bottom surface 32, and a guiding conical flare 34 respectively created along each rim of the top surface 31 and bottom surface 32 such that the outer diameter of top stair rim abutting top surface 31 is greater than the outer diameter of bottom stair rim abutting bottom surface 32 (FIG. 25);

Said adapted cylindrical elastic sleeving collet 60, which is unitarily extruded in one piece by plastics molding into hollow cylinder to be slid into the jointing circular through-hole 33 of the annular cooperative bushing collar 30, includes a peripheral gorgerin 63 integrating a top surface 61 and a bottom surface 62 with a circular sliding through hole 64 running through therein, an annular cambered locking flange 65 abutting the bottom surface 62 and an elongated annular delimiting flange 66 abutting the top surface 61 as well as a plurality of longitudinal hooping slits 67 of circumferentially equivalent-space created along the bottom surface 62 towards the top surface 61 to be communicable with the circular sliding through hole 64, and a plurality of elastic griping ribs 68 of circumferentially equivalent-space created between two adjacent longitudinal hooping slit 67, the longitudinal thickness t of elongated annular delimiting flange 66) is lengthened into at least double length for the original longitudinal thickness of the conventional annular delimiting flange 46 (FIGS. 6 and 22); wherein the outer diameter d1 of the peripheral gorgerin 63 is smaller than the inner diameter d2 of the jointing circular through-hole 33 in the annular cooperative bushing collar 30, the outer diameter d3 of the annular cambered locking flange 65 is greater than the inner diameter d2 of the jointing circular through-hole 33 in the annular cooperative bushing collar 30 and the outer diameter d4 of the elongated annular delimiting flange 66 is greater than the inner diameter d3 of the annular cambered locking flange 65 (FIGS. 4 and 24); and Said accessory latching clip 50, which is unitarily extruded in one piece by plastics molding into planiform collar to be served as clamping means for assembled pipe fitting, includes a U-shaped nick 51 with two prongs of straight legs encompassing central cut nick such that the width h between two legs of the U-shaped nick 51 is slightly greater than the outer diameter d1 of the peripheral gorgerin 43 in the cylindrical elastic sleeving collet 40 (FIG. 8).

Wherein, the pipe fitting of elbow type 10 can be adapted into "− (minus) type" with two coupling unions 11, "T (Tee) type" or "Y (wye) type" with three coupling unions 11, or "+(plus) type" with four coupling unions 11.

Figure 1:
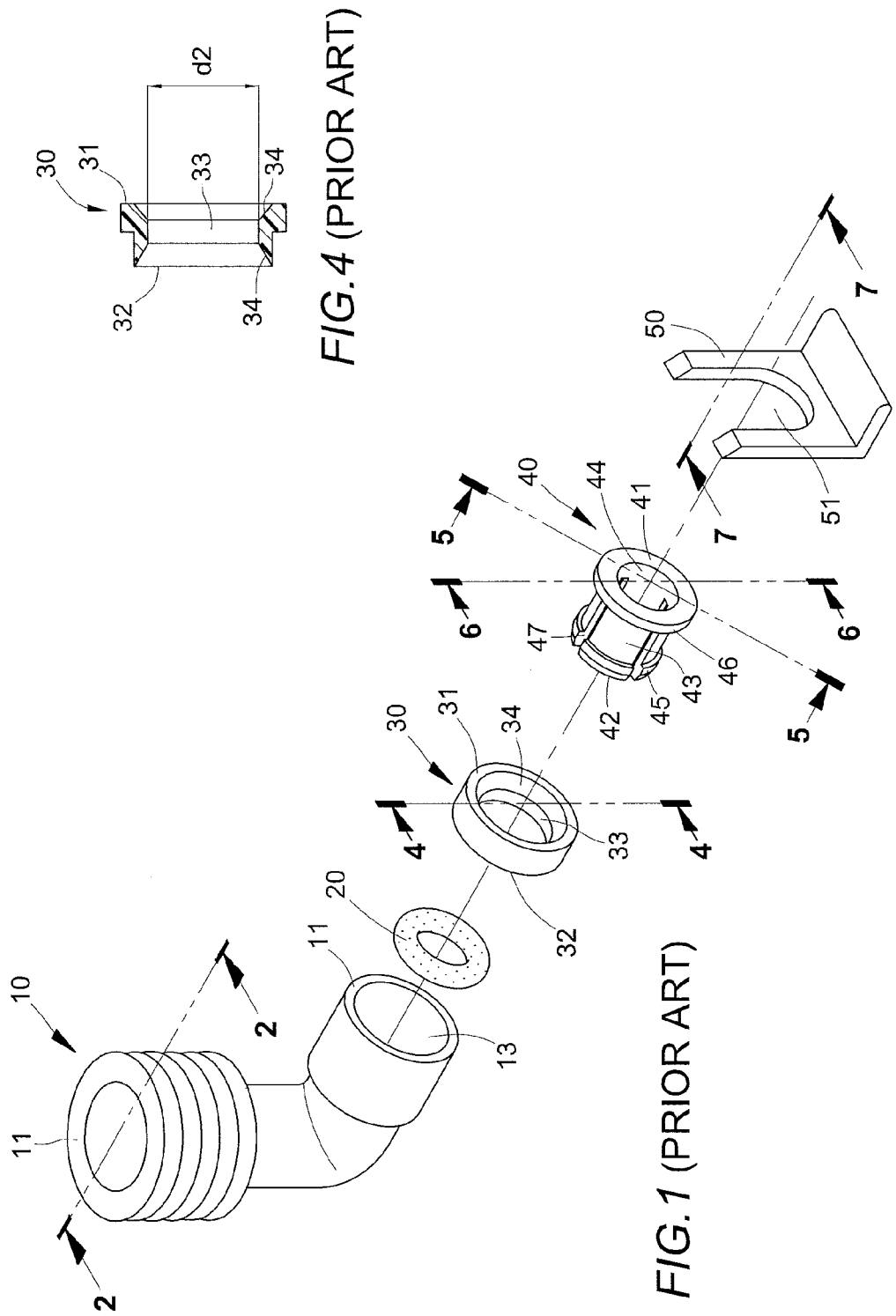
FIG. 1 is an exploded perspective schematic view for the conventional tube/pipe fitting of elbow inserting type.
Figure 2:
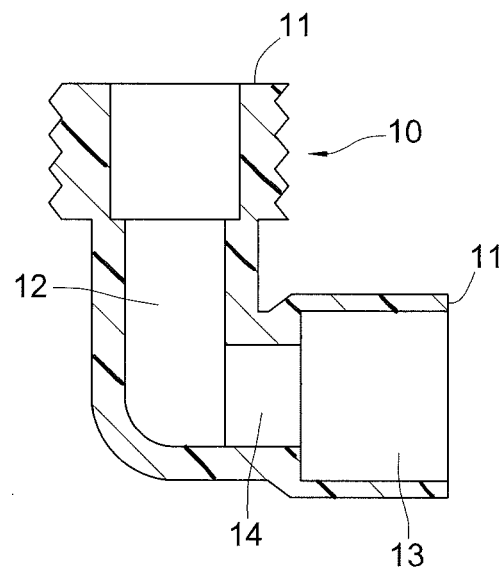
FIG. 2 is a cross sectional view taken from the 2-2 section line of previous FIG. 1 for showing a tube/pipe fitting of elbow inserting type.
Figure 3:
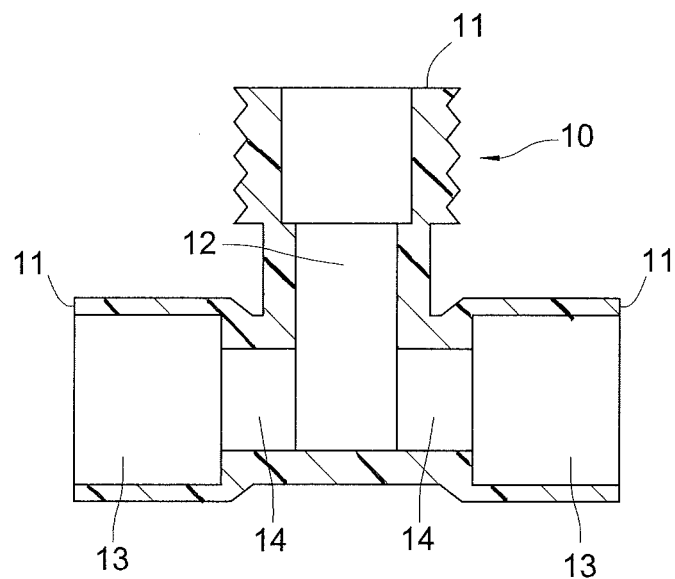
FIG. 3 is a cross sectional view for showing a tube/pipe fitting of T (Tee) inserting type in another embodiment.
Figure 9:
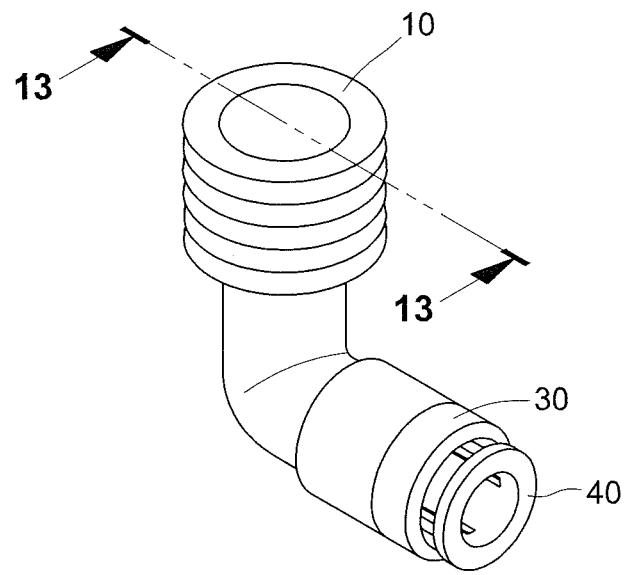
FIG. 9 is a perspective assembly view for the conventional tube/pipe fitting of elbow inserting type.
Figure 10:
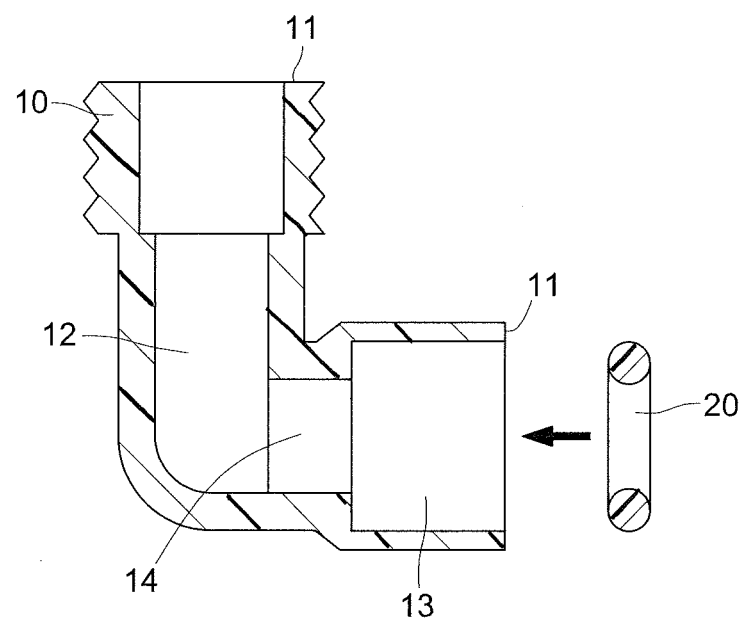
FIG. 10 is the first assembly view for the conventional tube/pipe fitting of elbow inserting type.
Figure 11:
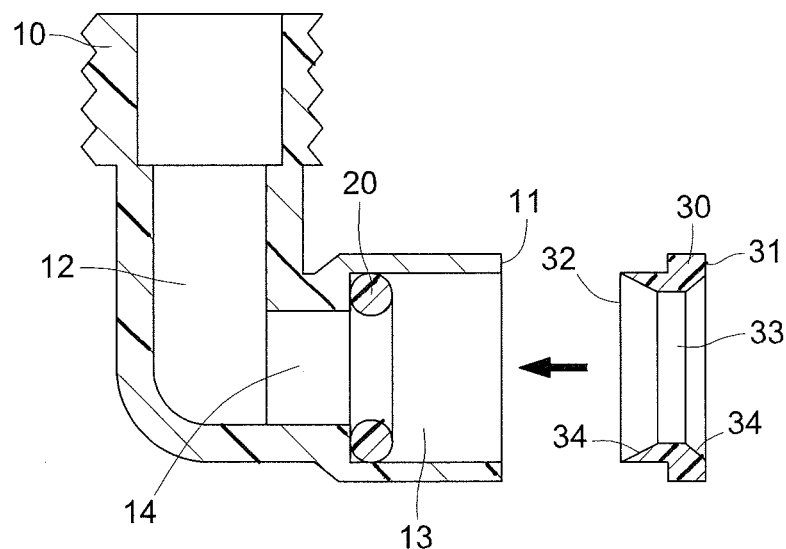
FIG. 11 is the second assembly view for the conventional tube/pipe fitting of elbow inserting type.
Figure 12:
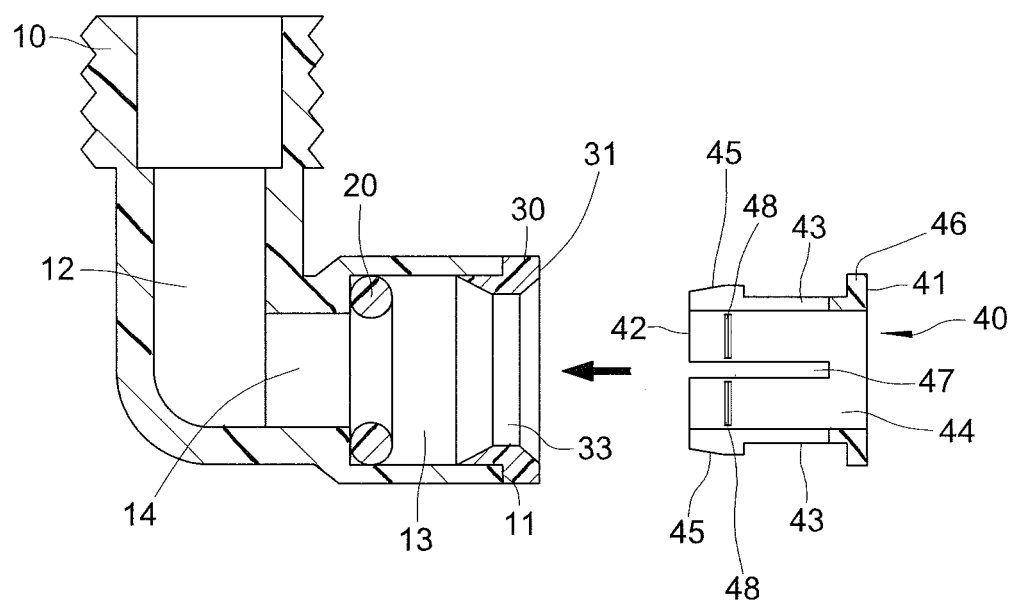
FIG. 12 is the third assembly view for the conventional tube/pipe fitting of elbow inserting type.
Figure 13:
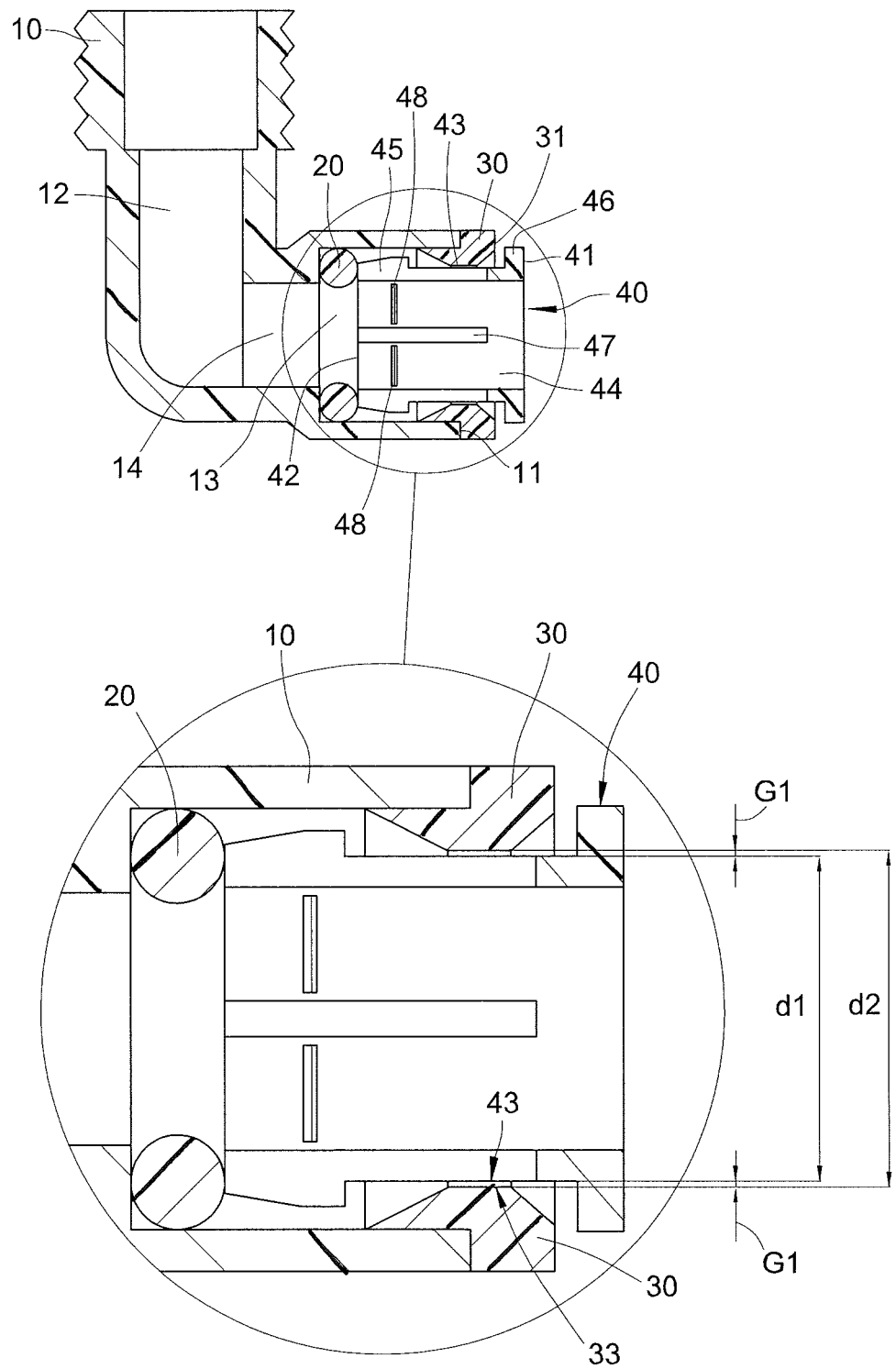
FIG. 13 is the fourth assembly view for the conventional tube/pipe fitting of elbow inserting type.
Figure 14:
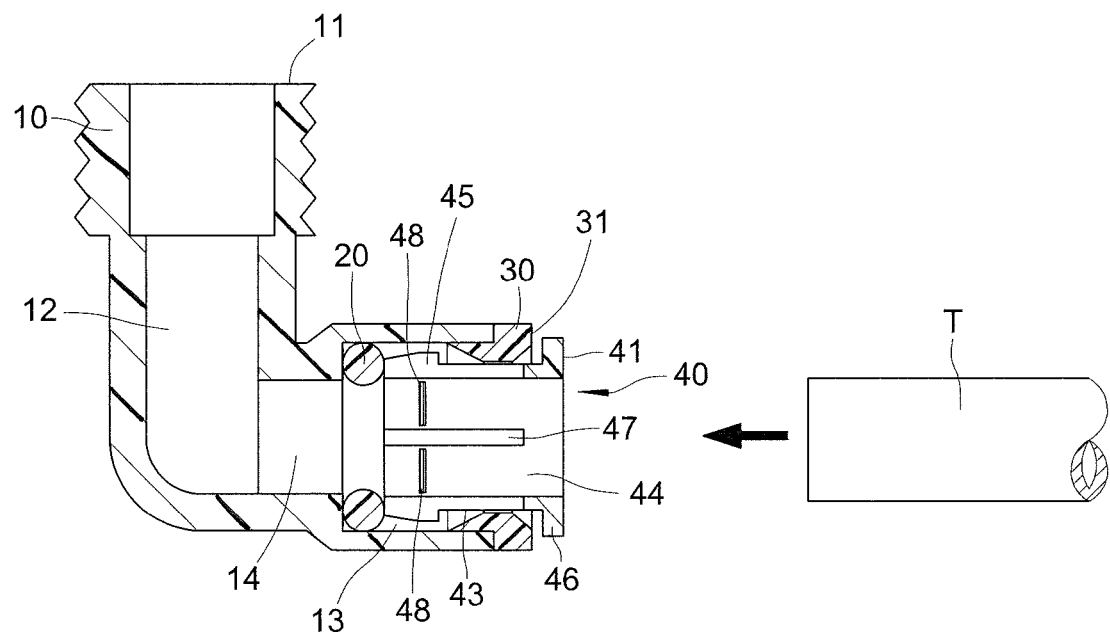
FIG. 14 is the first schematic view showing the coupling of water tube/pipe with conventional tube/pipe fitting of elbow inserting type.

The pipe fitting of "T (Tee) type" or "Y (wye) type" with three coupling unions 11, which are configured as that each coupling union 11 is disposed on each end of "T" trunks, and communicable with a common hollow water passage 12 as shown in FIG. 3, includes a pair of cylindrical retainers 13 and a cylindrical docking receptacle 14 such that each coupling union 11 on the horizontal trunk encloses each corresponding cylindrical retainer 13 therein, and the cylindrical docking receptacle 14 runs through the pair cylindrical retainers 13 in communicable with the hollow water passage 12, wherein the inner diameter of each cylindrical retainer 13 is greater than the aperture of the cylindrical docking receptacle 14 (FIG. 3).

The pipe fitting of "–(minus) type" with two coupling unions 11 includes a hollow water passage 12, a cylindrical retainer 13 and a cylindrical docking receptacle 14 such that one coupling union 11 encloses the cylindrical retainer 13 therein, and the cylindrical docking receptacle 14 runs through the cylindrical retainer 13 in communicable with the hollow water passage 12, wherein the inner diameter of the cylindrical retainer 13 is greater than the aperture of the cylindrical docking receptacle 14.

The pipe fitting of "+(plus) type" with four coupling unions 11, which are configured as that each coupling union 11 is disposed on each end of "+" trunks, and communicable with a common hollow water passage 12, includes a pair of cylindrical retainers 13 and a cylindrical docking receptacle 14 such that each coupling union 11 on the horizontal trunk encloses each corresponding cylindrical retainer 13 therein, and the cylindrical docking receptacle 14 runs through the pair cylindrical retainers 13 in communicable with the hollow water passage 12, wherein the inner diameter of each cylindrical retainer 13 is greater than the aperture of the cylindrical docking receptacle 14.

Figure 22:
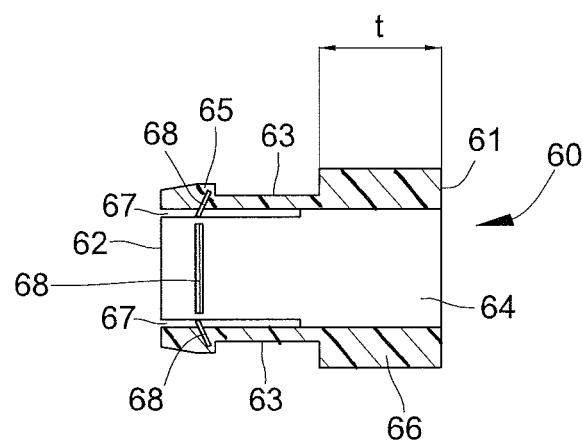
FIG. 22 is another cross sectional view taken from the 22-22 section line of previous FIG. 20 for showing the adapted cylindrical elastic sleeving collet in the first preferred exemplary embodiment of the present invention.
Figure 26:
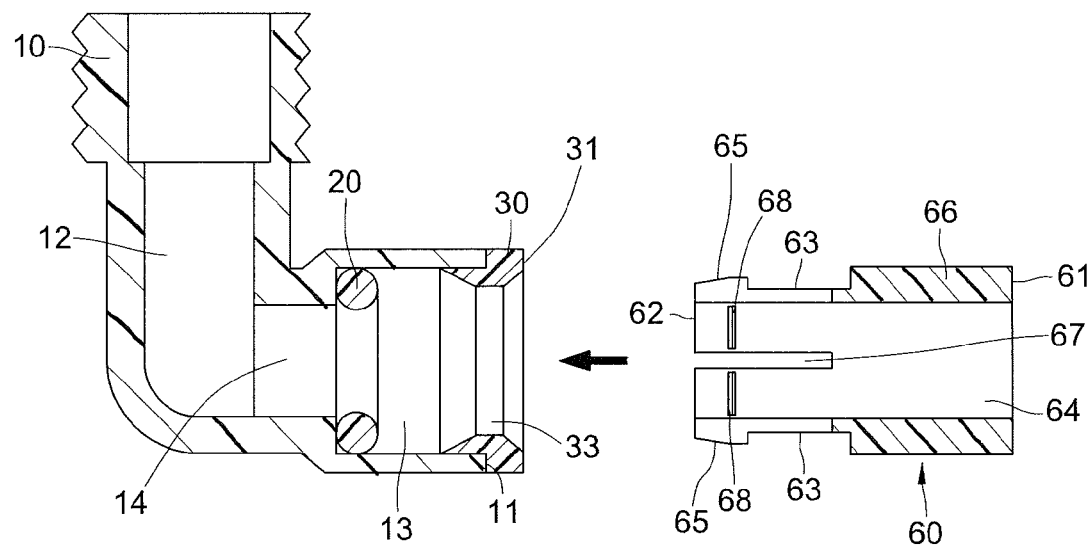
FIG. 26 is the third assembly view for a tube/pipe fitting of elbow inserting type in the first preferred exemplary embodiment of the present invention.
Figure 27:
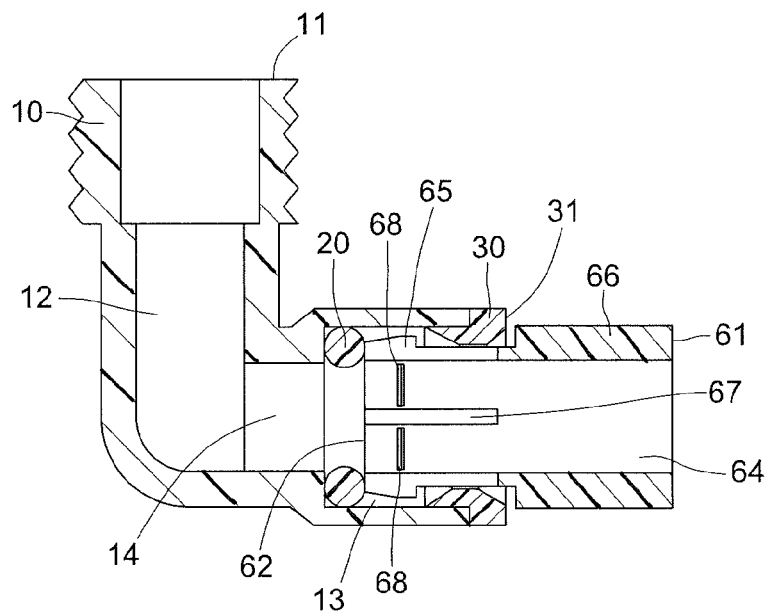
FIG. 27 is the fourth assembly view for a tube/pipe fitting of elbow inserting type in the first preferred exemplary embodiment of the present invention.

Please further refer to FIGS. 22 through 27. The assembling steps for the "leakage-proof pipe fitting of quick connection" for Reverse Osmosis Membrane (RO) water treatment unit of household in the first preferred exemplary embodiment of the present invention are shown as below.

a. Insert the sealing O-ring 20 into the cylindrical retainer 13 in the pipe fitting of elbow type 10 to the thorough end such that the sealing O-ring 20 contacts against the inner bottom wall of the cylindrical retainer 13 (FIGS. 24 and 25).

b. Facing the bottom surface 32 of the annular cooperative bushing collar 30 towards the cylindrical retainer 13 of the pipe fitting of elbow type 10, insert the annular cooperative, bushing collar 30 into the cylindrical retainer 13 of the pipe fitting of elbow type 10 (FIG. 25), then securely fix the annular cooperative bushing collar 30 onto the coupling union 11 of the pipe fitting of elbow type 10 by means of glue-bonding or high frequency melt-bonding method (FIG. 26).

c. Facing the bottom surface 62 of the adapted cylindrical elastic sleeving collet 60 towards the jointing circular through-hole 33 of the annular cooperative bushing collar 30, forcibly push the annular cambered locking flange 65 of the adapted cylindrical elastic sleeving collet 60 forwardly to pass it through the jointing circular through-hole 33 of the annular cooperative bushing collar 30 to finish the assembly for the "leakage-proof pipe fitting of quick connection" in the first preferred exemplary embodiment of the present invention (FIGS. 22 and 27).

Figure 28:
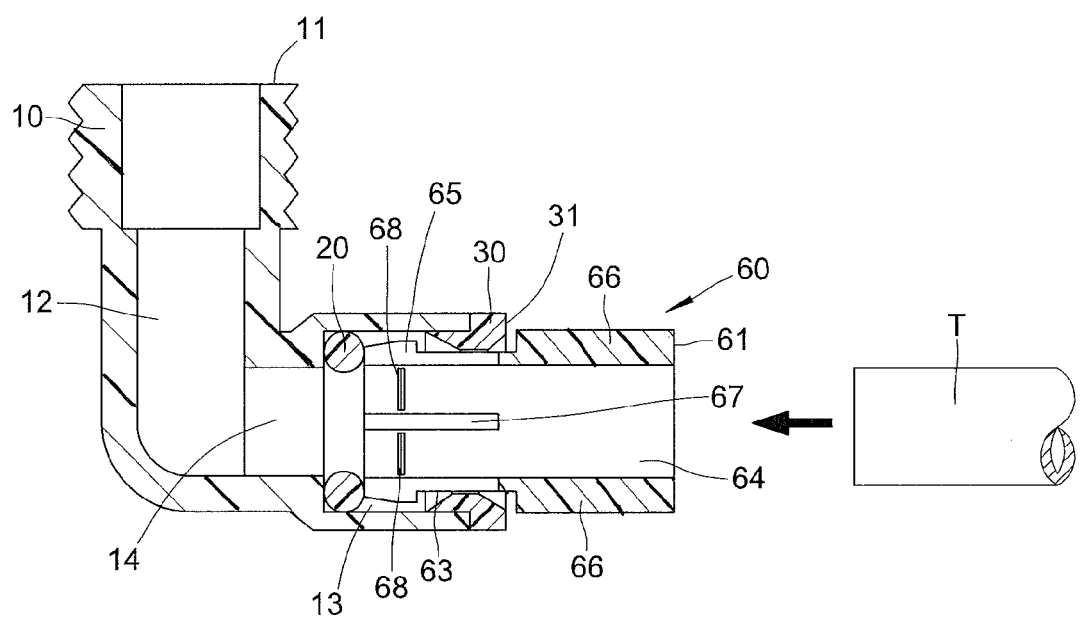
FIG. 28 is the first schematic view for showing the coupling of water tube/pipe with a tube/pipe fitting of elbow inserting type in the first preferred exemplary embodiment of the present invention.
Figure 29:
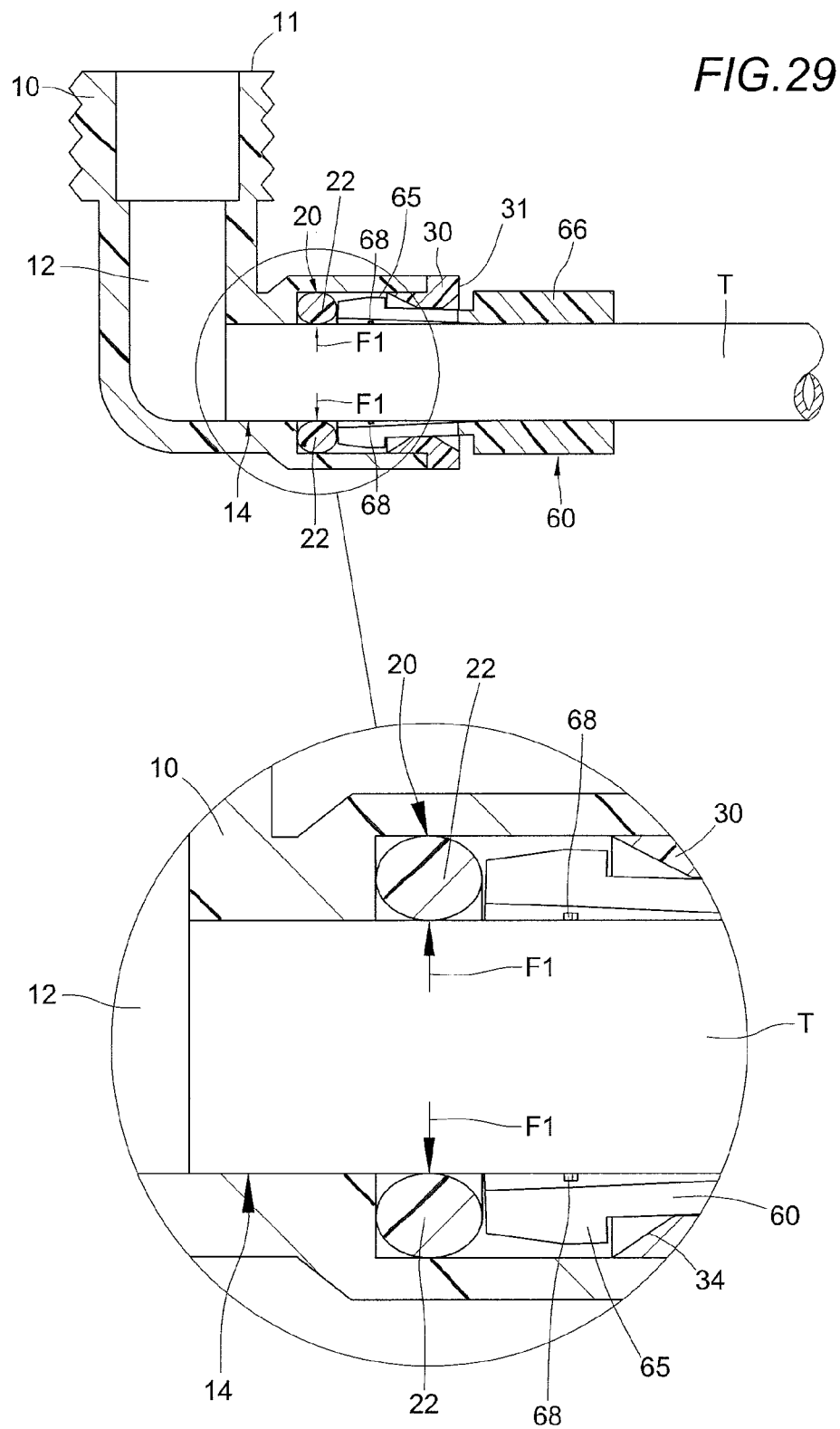
FIG. 29 is the second schematic view for showing the coupling of water tube/pipe with a tube/pipe fitting of elbow inserting type in the first preferred exemplary embodiment of the present invention.
Figure 30:
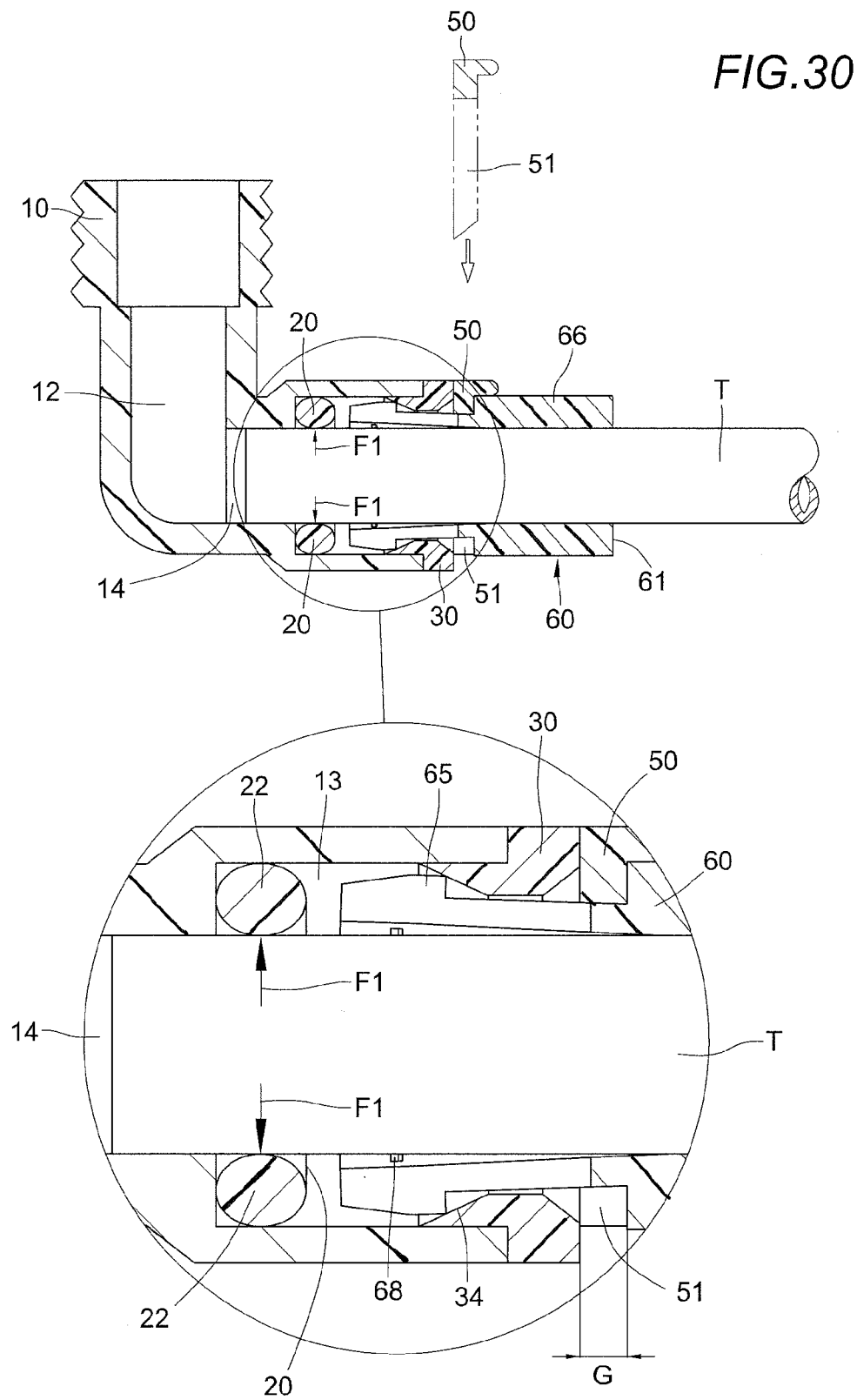
FIG. 30 is the third schematic view for showing the coupling of water tube/pipe with a tube/pipe fitting of elbow inserting type in the first preferred exemplary embodiment of the present invention.

Please refer to FIGS. 28 through 30. The mutually jointing steps between the "leakage-free pipe fitting of quick connection" for Reverse Osmosis Membrane (RO) water treatment unit of household in the first preferred exemplary embodiment of the present invention and the water tube/pipe are shown as below.

A. Align and insert a water tube/pipe T into the circular sliding through hole 64 in the top surface 61 of the adapted cylindrical elastic sleeving collet 60 (FIG. 28), then force the water tube/pipe T orderly pass through the circular sliding through hole 64 of the adapted cylindrical elastic sleeving collet 60, the inner bore of the sealing O-ring 20 up to the cylindrical docking receptacle 14 of the pipe fitting of elbow type 10 (FIG. 29). At this moment, the water tube/pipe T is firmly sleeved by the elastic griping ribs 68 of the circular sliding through hole 64 in the adapted cylindrical elastic sleeving collet 60, and the sealing O-ring 20 is under symmetrically isometric deformed by the compressing force F1 caused by the outer wall of the water tube/pipe T so that a leakage-free effect due to closely contact between the water tube/pipe T and the cylindrical docking receptacle 14 of the pipe fitting of elbow type 10 is created, wherein (FIG. 29) is a cross sectional view showing a symmetrically isometric deformation 22 of the sealing O-ring 20, which becomes oval shape.

B. hold exposed section of the water tube/pipe T outside of the adapted cylindrical elastic sleeving collet 60, then pull it outwards along the top surface 61 of the adapted cylindrical elastic sleeving collet 60 so that the adapted cylindrical elastic sleeving collet 60 with elongated annular delimiting flange 66 is simultaneously drawn outwards with a certain displacement due to securely clamping of the adapted cylindrical elastic sleeving collet 60 onto the outer wall of the water tube/pipe T. Thereby, the outwardly drawn elongated annular delimiting flange 66 detaches off the annular cooperative bushing collar 30 to create a clearance G against the top surface 31 of the annular cooperative bushing collar 30 with same displacement as that of the adapted cylindrical elastic sleeving collet 60 (FIG. 30 and associated partially magnified view).

C. Align the U-shaped nick 51 of the accessory latching clip 50 with the clearance G in the step B, then thoroughly inset the accessory latching clip 50 up to the inner hemispherical bottom of the U-shaped nick 51 contacts against the peripheral gorgerin 63 of the adapted cylindrical elastic sleeving collet 60 so that the adapted cylindrical elastic sleeving collet 60 is tightly fixed in stable manner without free moving possibility in the jointing circular through-hole 33 of the annular cooperative bushing collar 30 to complete the mutually jointing procedure between the "leakage-free pipe fitting of quick connection" of the present invention and the water tube/pipe T (FIG. 30). Thus, the mutually jointing procedure between the "leakage-free pipe fitting of quick connection" in the first preferred exemplary embodiment of the present invention and the water tube/pipe T does not change core in the mutually jointing procedure between the conventional tube/pipe fittings of inserting type and the water tube/pipe T so that the quick connecting feature thereof is remained.

Figure 18:
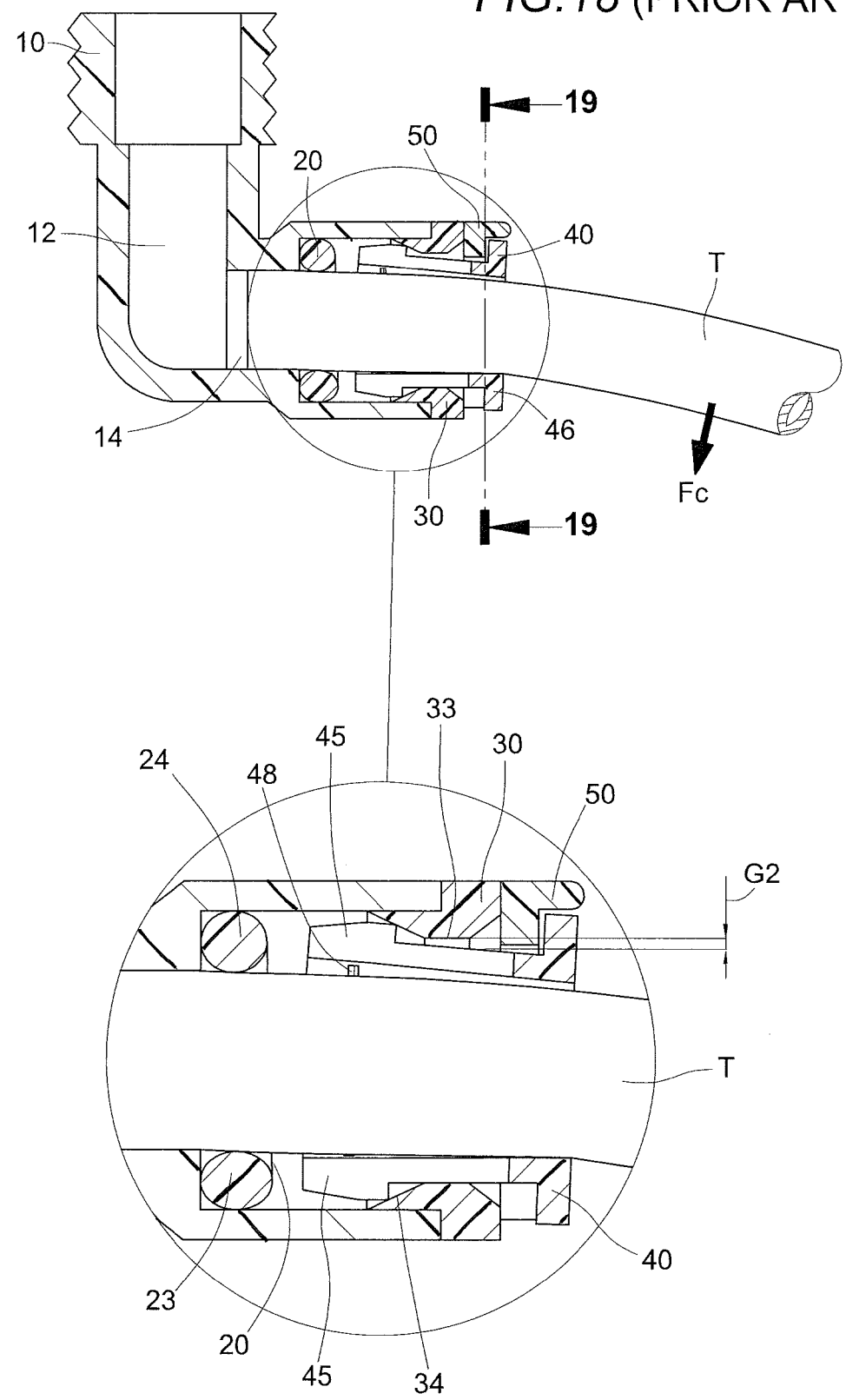
FIG. 18 is a cross section schematic view showing the morphological status of coupled water tube/pipe in a conventional tube/pipe fitting of elbow inserting type during being deformed by bending force.
Figure 19:
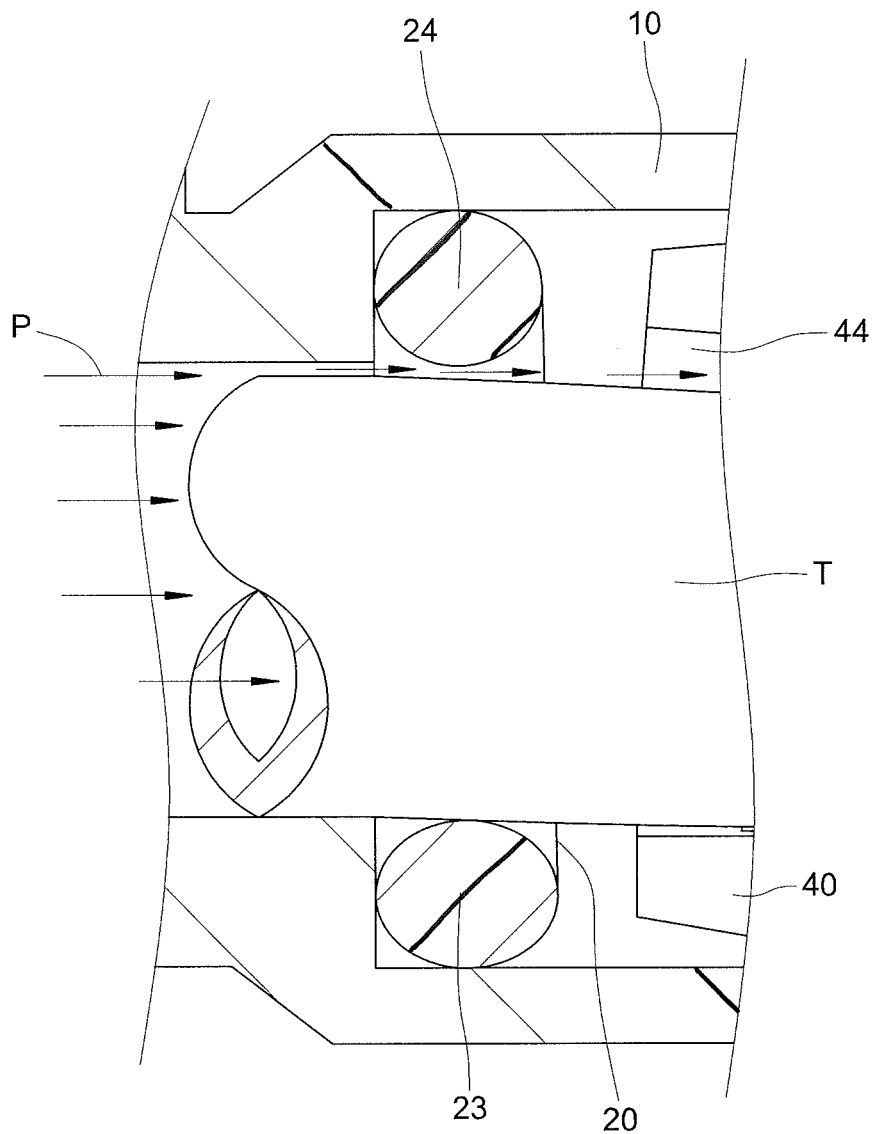
FIG. 19 is a cross sectional view taken from the 19-19 section line of previous FIG. 18.
Figure 20:
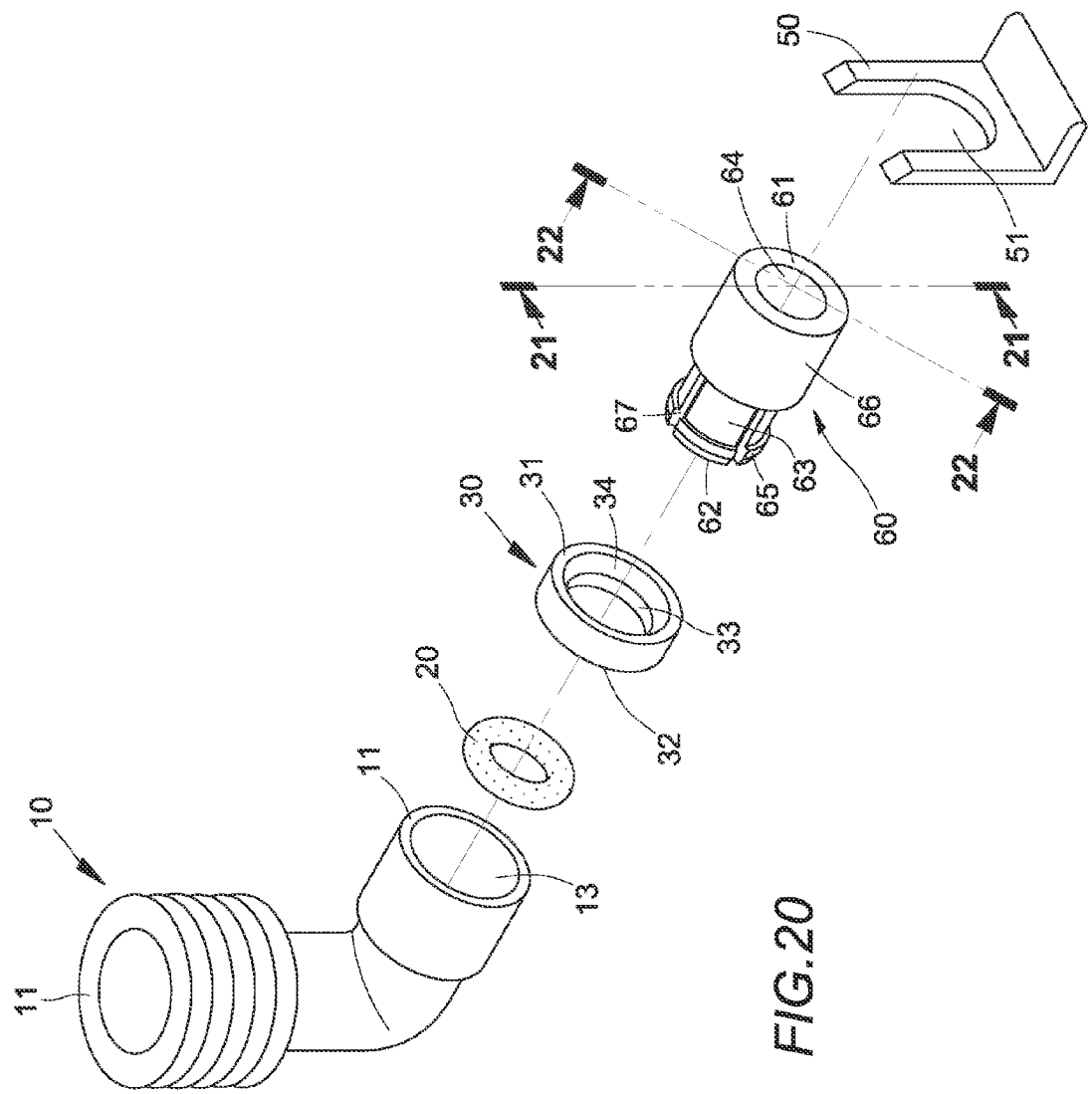
FIG. 20 is an exploded perspective schematic view for a tube/pipe fitting of elbow inserting type in the present invention.
Figure 21:
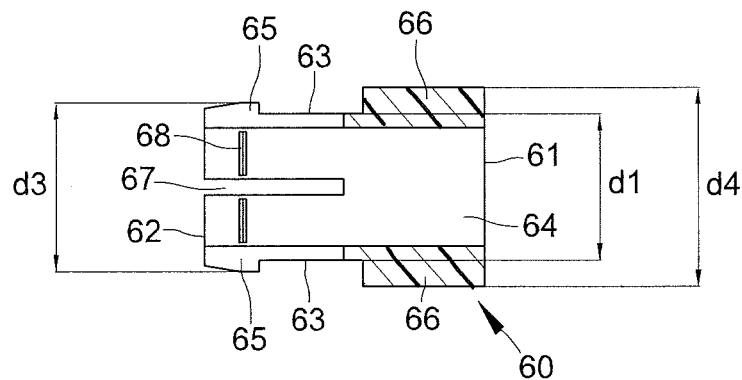
FIG. 21 is a cross sectional view taken from the 21-21 section line of previous FIG. 20 for showing an adapted cylindrical elastic sleeving collet in the first preferred exemplary embodiment of the present invention.
Figure 31:
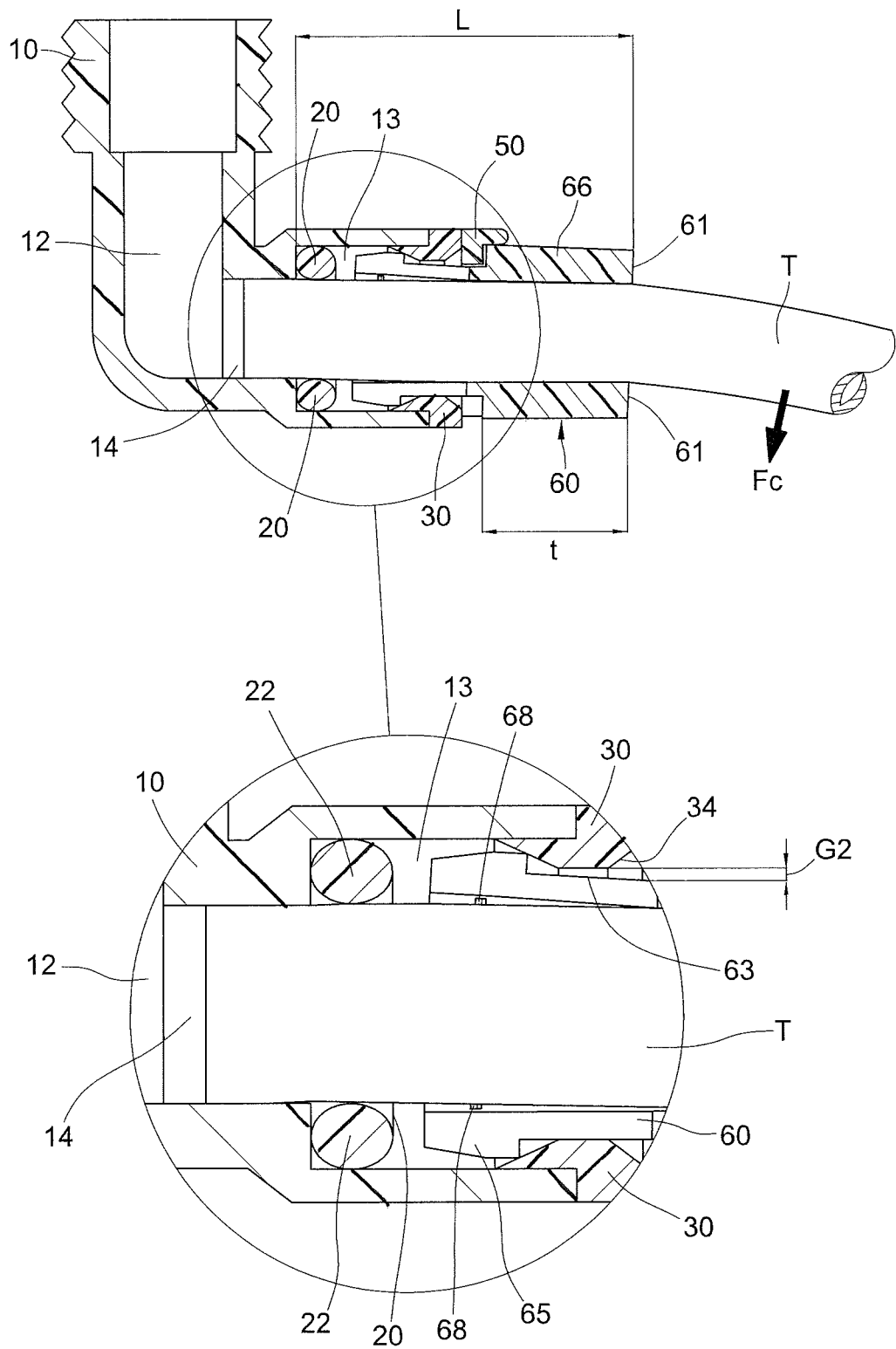
FIG. 31 is a cross section schematic view for showing the morphological status of coupled water tube/pipe in a tube/pipe fitting of elbow inserting type of the first preferred exemplary embodiment of the present invention during being deformed by bending force.
Figure 32:
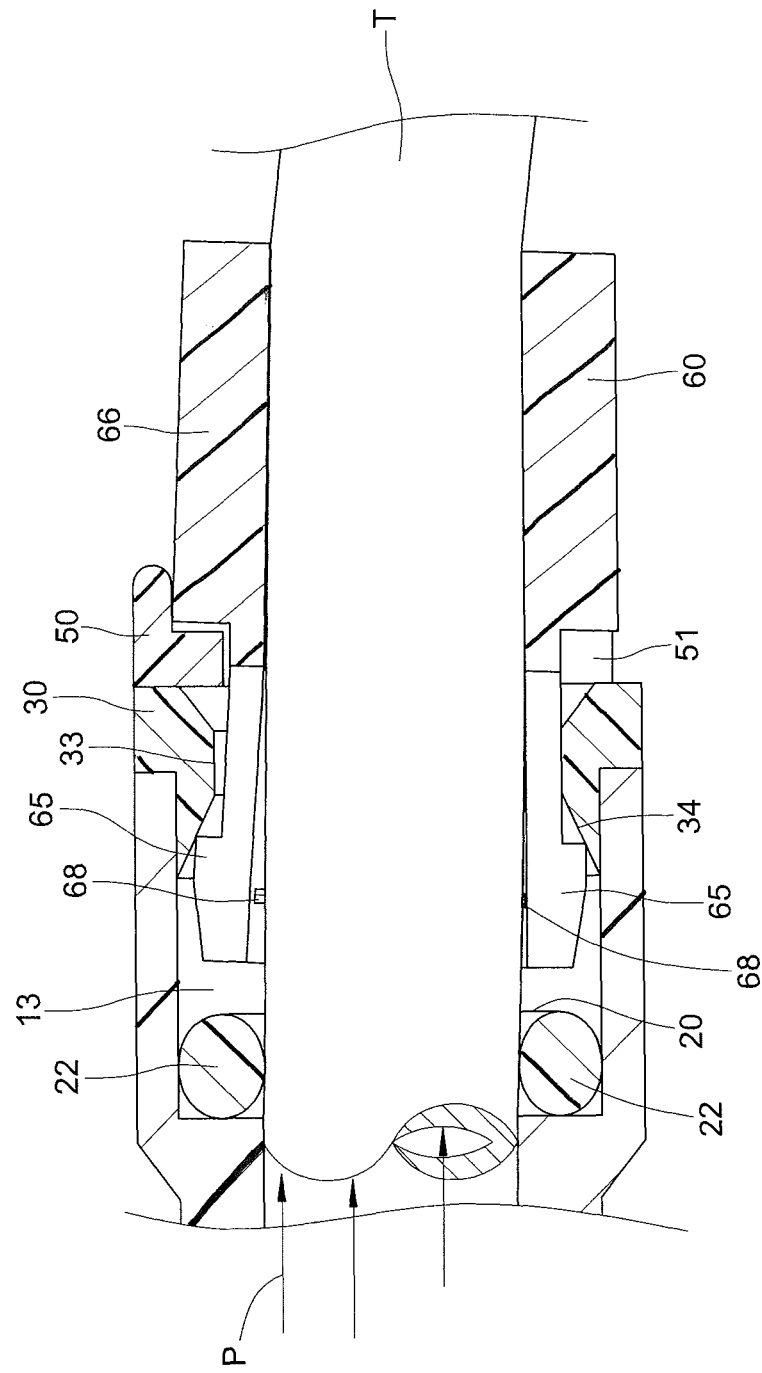
FIG. 32 is a cross section schematic view for showing the morphological status of coupled water tube/pipe in a tube/pipe fitting of elbow inserting type of the first preferred exemplary embodiment of the present invention without leakage of compressed water therein after being deformed by bending force.
Figure 34:
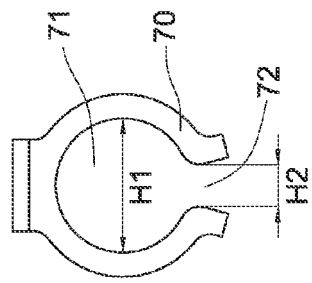
FIG. 34 is a front view for showing an adapted accessory latching clip in the second preferred exemplary embodiment of the present invention.
Figure 33:
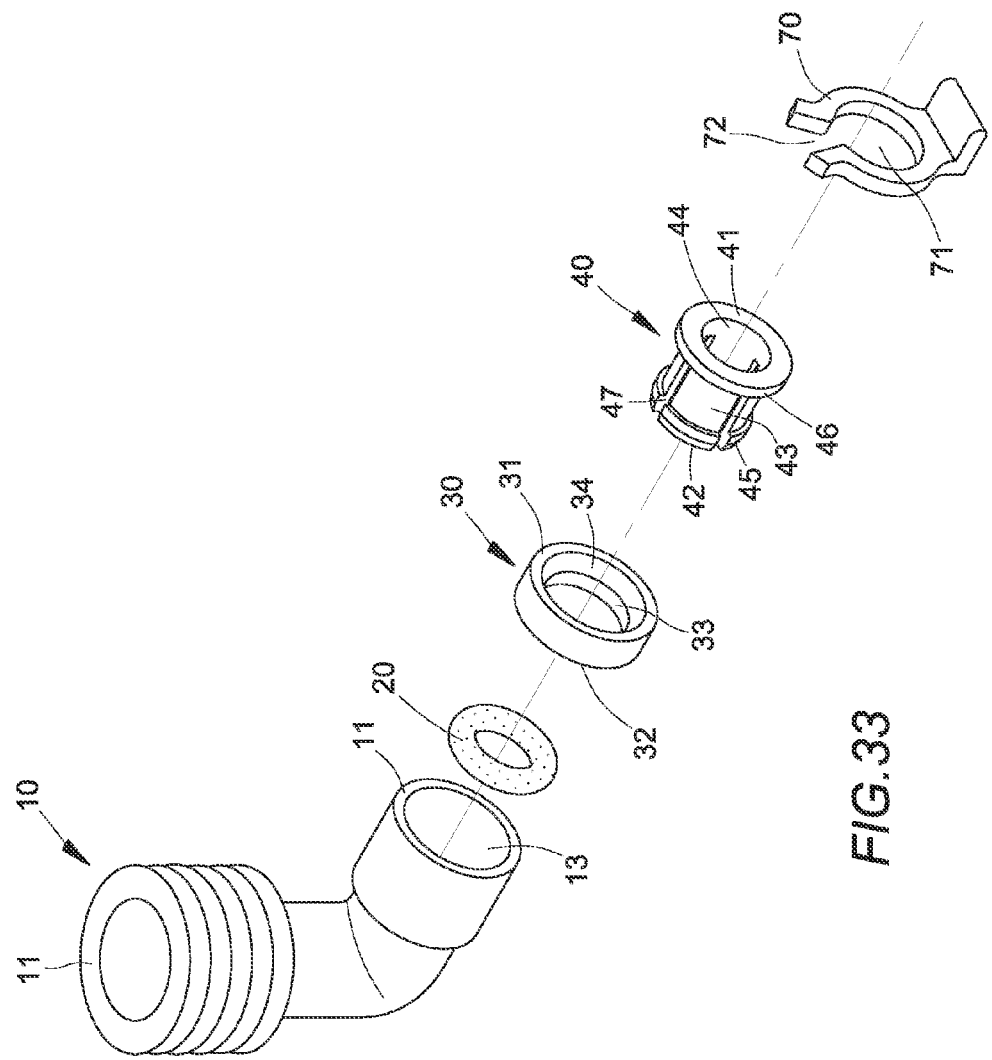
FIG. 33 is a perspective exploded view for a tube/pipe fitting of elbow inserting type in the second preferred exemplary embodiment of the present invention.
Figure 35:
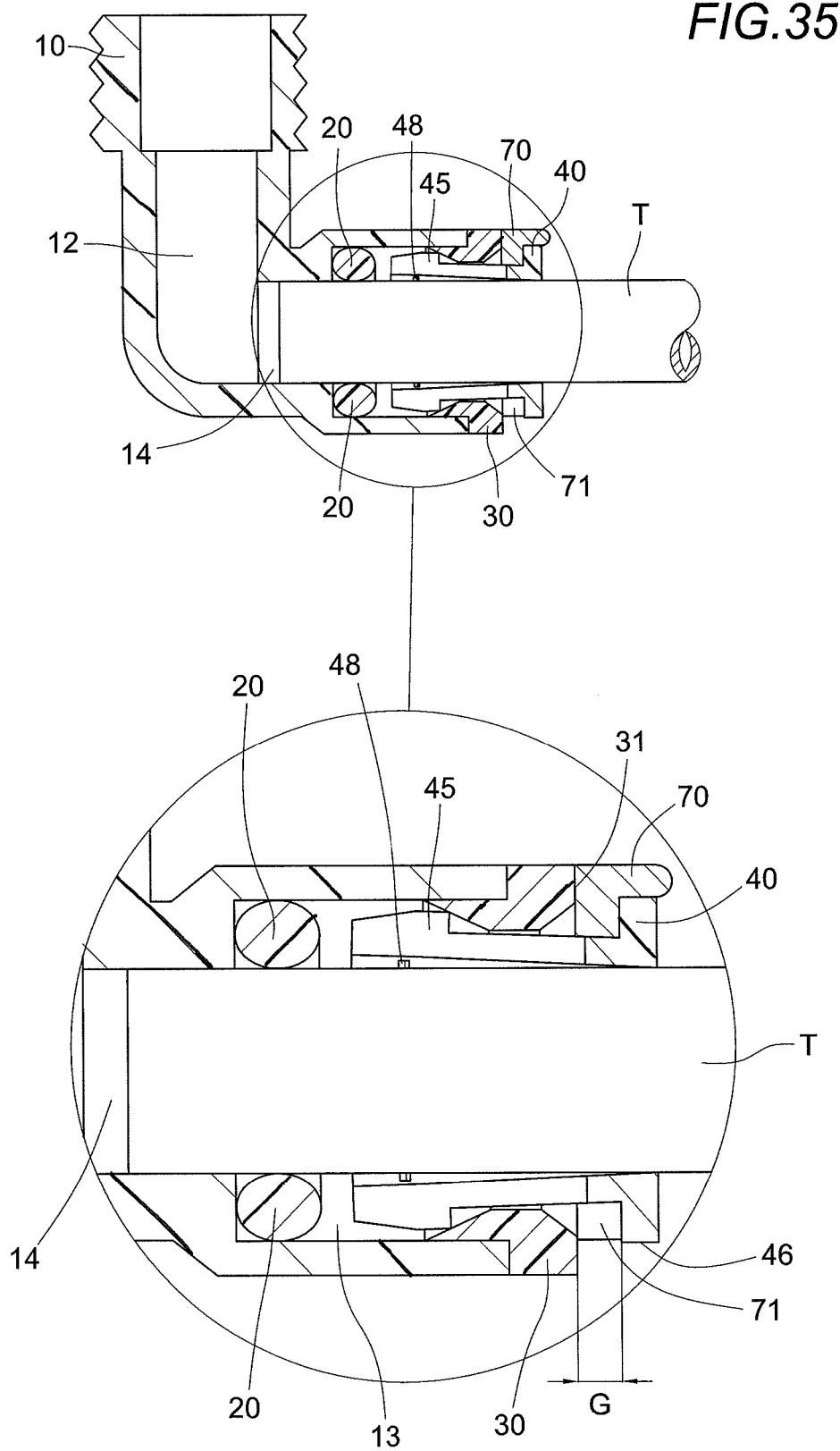
FIG. 35 is a cross section schematic view for showing the coupling of water tube/pipe with a tube/pipe fitting of elbow inserting type in the second preferred exemplary embodiment of the present invention.

Please refer to FIGS. 30 through 32. Even if the water pipe/tube T is bent towards the opening of the U-shaped nick 51 in the accessory latching clip 50 by a bending force Fc (FIGS. 18 and 19), a partial section of the elongated annular delimiting flange 66, which is corresponding to the opening of the U-shaped nick 51, will lose support from the accessory latching clip 50. With the adapted cylindrical elastic sleeving collet 60 sandwiched between the sealing O-ring 20 and the adapted cylindrical elastic sleeving collet 60, a partial section of the peripheral gorgerin 63 in corresponding to the arrowhead of bending force Fc will keep closely contact with the inner wall of the jointing circular through-hole 33 while another partial section of the peripheral gorgerin 63 in opposed to the arrowhead of bending force Fc will detach the inner wall of the jointing circular through-hole 33 to create a gap G2 (FIG. 30 and associated partially magnified view).

Figure 15:
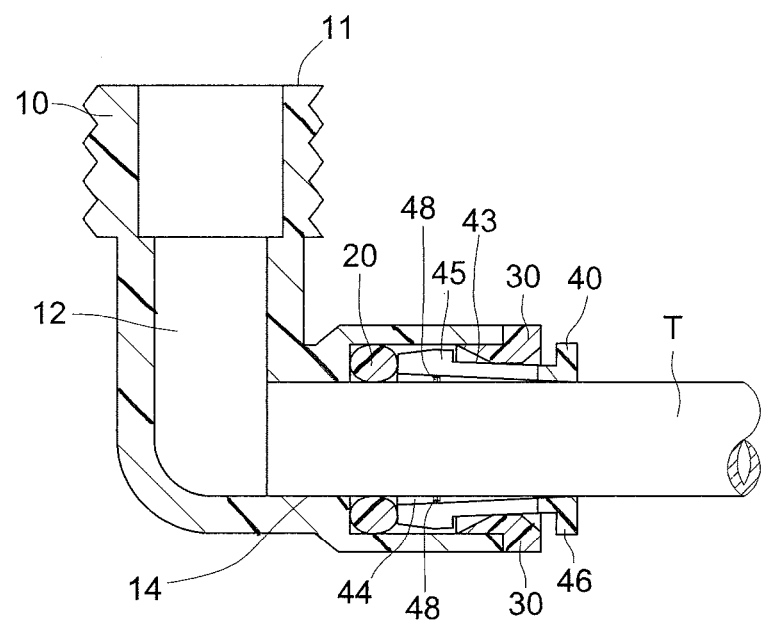
FIG. 15 is the second schematic view showing the coupling of water tube/pipe with conventional tube/pipe fitting of elbow inserting type.
Figure 16:
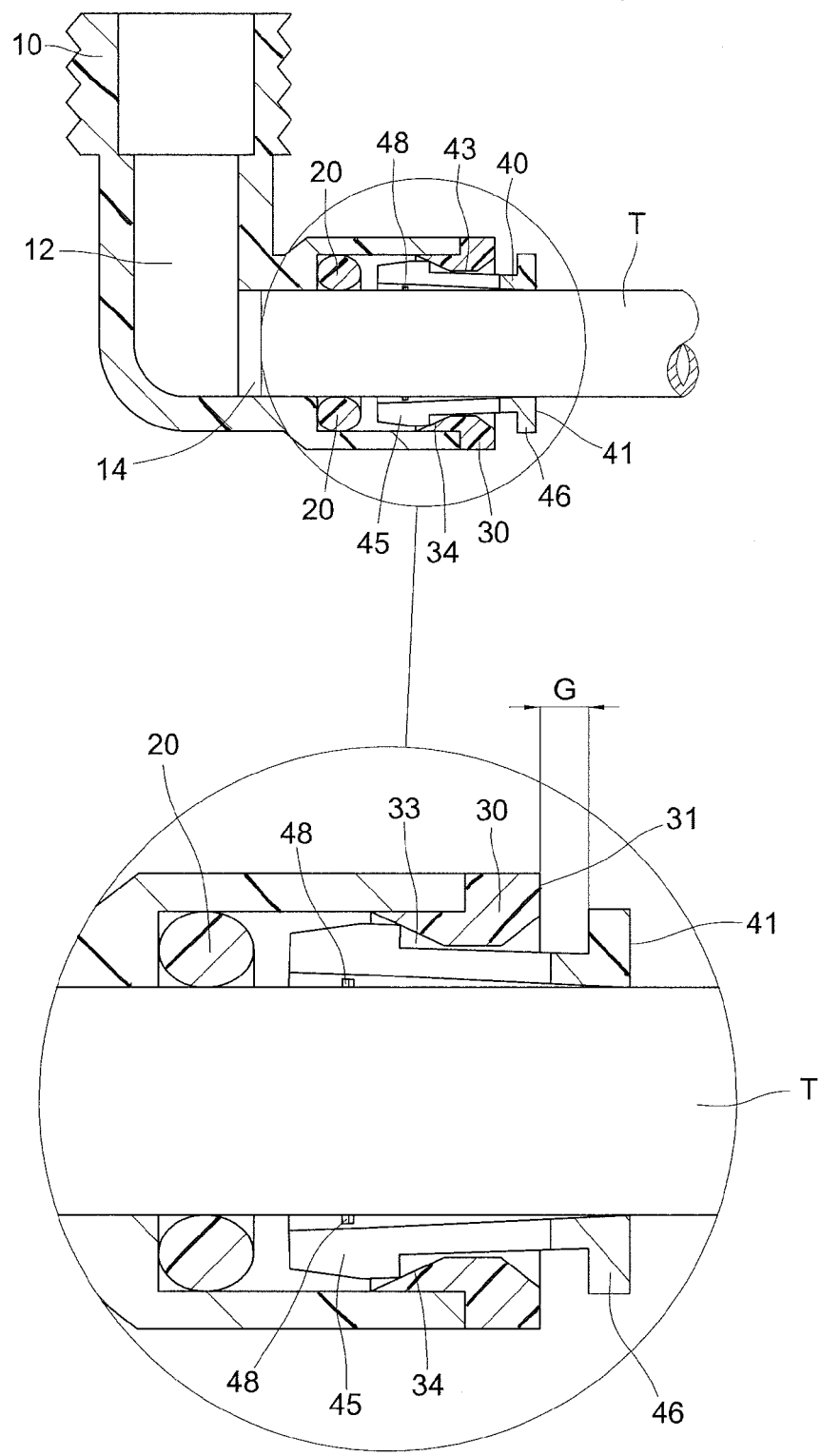
FIG. 16 is the third schematic view showing the coupling of water tube/pipe with conventional tube/pipe fitting of elbow inserting type.
Figure 17:
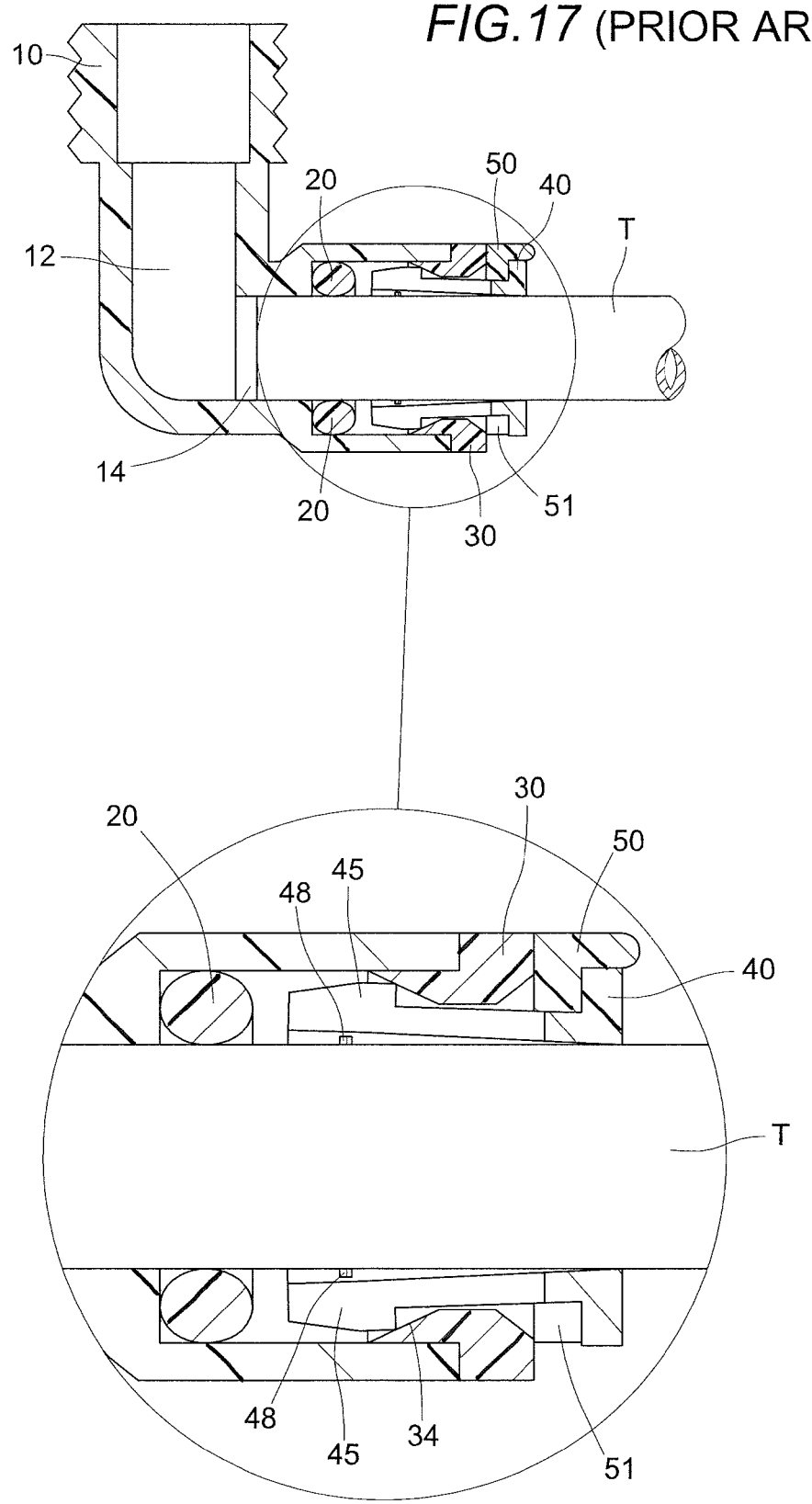
FIG. 17 is the fourth schematic view showing the coupling of water tube/pipe with conventional tube/pipe fitting of elbow inserting type.

With the longitudinal thickness t of the elongated annular delimiting flange 66 in the adapted cylindrical elastic sleeving collet 60, the embracing distance L from the top surface 61 of the adapted cylindrical elastic sleeving collet 60 to the bottom surface of the cylindrical retainer 13 in the pipe fitting of elbow type 10 is lengthened as well (FIG. 31) so that the curvature for the bent water pipe/tube T covered by the embracing distance L is reduced. Thereby, the sealing O-ring 20 is no more suffered from uneven stress from the water pipe/tube T because the sealing O-ring 20 and the water pipe/tube T in the cylindrical docking receptacle 14 of the pipe fitting of elbow type 10 are firmly sleeved and propped by the elongated annular delimiting flange 66 of the adapted cylindrical elastic sleeving collet 60 therein. Thus, without uneven stress from the water pipe/tube T, the original symmetrically isometric deformation 22 (FIG. 15-a) of the sealing O-ring 20 will be remained as shown in the associated partially magnified view of FIG. 31. Therefore, no matter which way of the water pipe/tube T bent caused by the orientation of bending force Fc, under the sleeving and propping effect of the longitudinal thickness t of the elongated annular delimiting flange 66 in the adapted cylindrical elastic sleeving collet 60, the even closely sealing effect of the sealing O-ring 20 over the outer wall of the water pipe/tube T is unaffected. Thus, no more compressed water P in the water pipe/tube T can be seeped out via partial section of bad sealing effect of the sealing O-ring 20 in asymmetrically non-isometric deformation. Consequently, no more seeping compressed water P can be leaked out of the adapted cylindrical elastic sleeving collet 60 via the elongated annular delimiting flange 66 therein to dribble over the circuit cabling or compressed pump of the RO water treatment unit so that the serious leakage drawback in the water pipe/tube fitting of quick connection is completely solved (FIG. 32).

Figure 36:
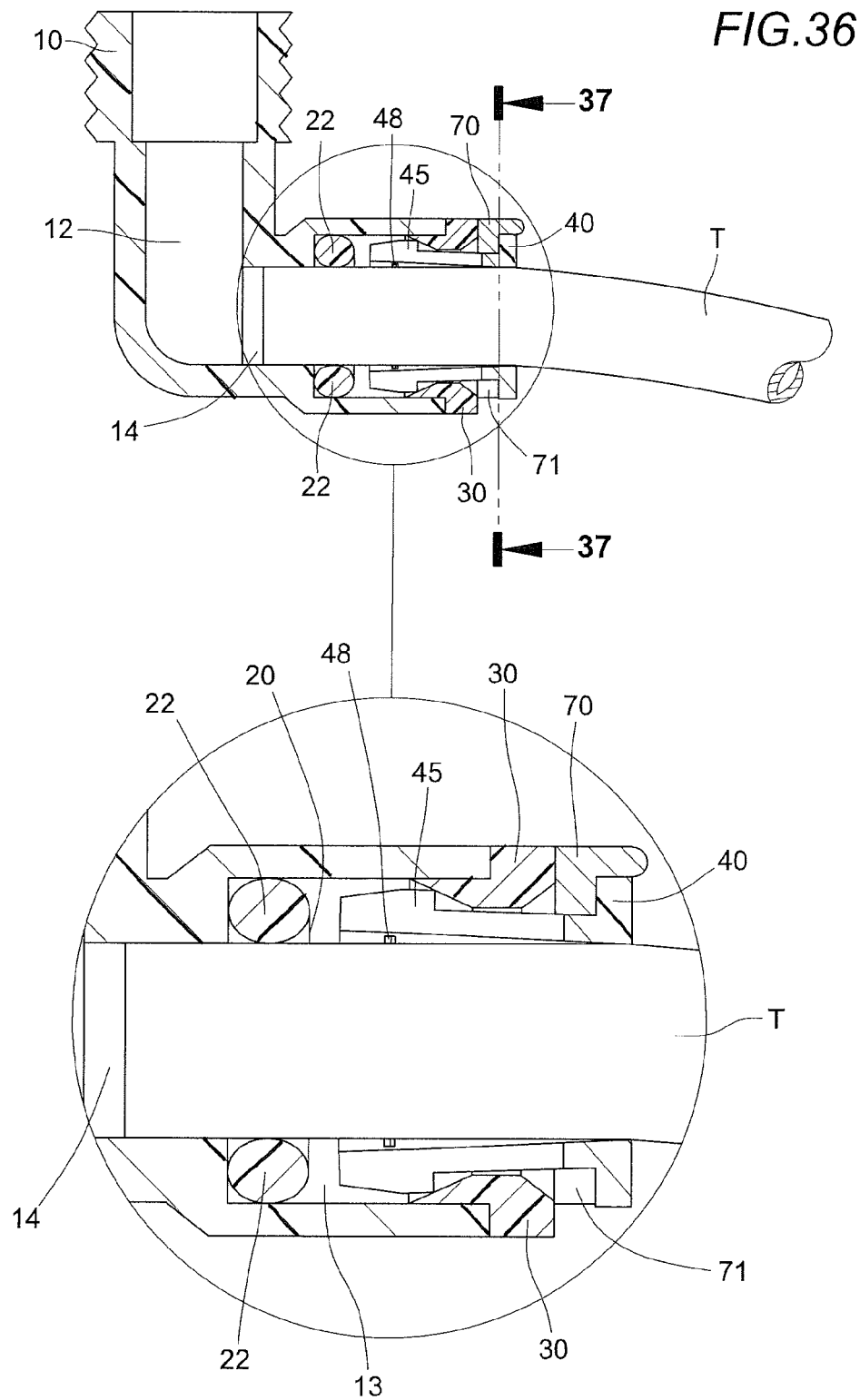
FIG. 36 is a cross section schematic view for showing the morphological status of coupled water tube/pipe in a tube/pipe fitting of elbow inserting type of the second preferred exemplary embodiment of the present invention during being deformed by bending force.
Figure 37:
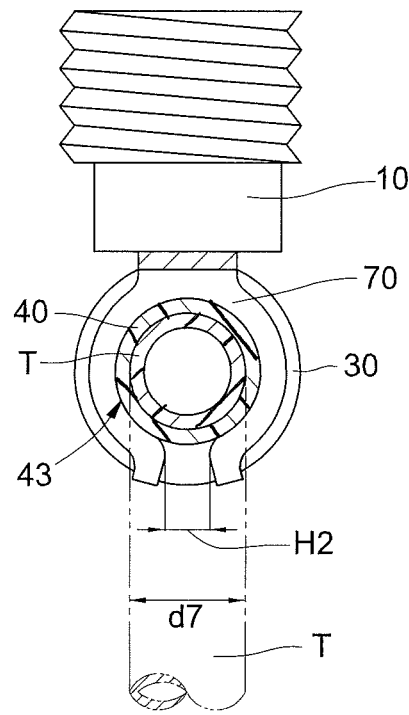
FIG. 37 is a cross sectional view taken from the 37-37 section line of previous FIG. 36 for the second preferred exemplary embodiment of the present invention.

Please refer to FIGS. 33 through 37, which show the "leakage-proof pipe fitting of quick connection" for Reverse Osmosis Membrane (RO) water treatment unit of household in the second preferred exemplary embodiment of the present invention. Here, the original accessory latching clip 50 and the U-shaped nick 51 with two prongs of straight legs encompassing the central nick in the conventional tube/pipe fittings of inserting type (FIGS. 1 through 8) is modified into an adapted accessory latching clip 70 and an adapted U-shaped nick 71 with two prongs of curved legs encompassing the central nick such that an outcurved knee bulge configured by two outcurved knees has a maximal width of outcurved knee bulge H1 while an incurved toe gap 72 configured by two incurved toes has a minimal width of incurved toe gap H2 (FIG. 34), which is less than the outer diameter d1 of the peripheral gorgerin 43 in the cylindrical elastic sleeving collet 40 (FIG. 6); wherein the adapted accessory latching clip 70 is unitarily extruded in one piece by plastics molding or metal material by latching process or casting process into planiform collar. The application of the adapted accessory latching clip 70 is almost the same as that of the conventional accessory latching clip 50. Just align the incurved toe gap 72 of the adapted U-shaped nick 71 in the adapted accessory latching clip 70 with the clearance G between the annular delimiting flange 46 of the cylindrical elastic sleeving collet 40 and the top surface 31 of the annular cooperative bushing collar 30, forcibly distend the minimal width of incurved toe gap H2 formed two incurved toes of the incurved toe gap 72 for being able to pass the peripheral gorgerin 43 of the cylindrical elastic sleeving collet 40 and immediately recovered into original status. Then, thoroughly inset the adapted accessory latching clip 70 up to the inner hemispherical bottom of the adapted U-shaped nick 71 contacts against the peripheral gorgerin 43 of the cylindrical elastic sleeving collet 40 so that the adapted accessory latching clip 70 can encompass most circumferential portion of the peripheral gorgerin 43 of the cylindrical elastic sleeving collet 40 (FIG. 37). Thereby, the cylindrical elastic sleeving collet 40 is tightly fixed in stable manner without any possibility of moving to and fro in the jointing circular through-hole 33 of the annular cooperative bushing collar 30 (FIG. 36).

Even if the water pipe/tube T is bent towards the opening of the adapted U-shaped nick 71 in the adapted accessory latching clip 70 by a bending force Fc, the water pipe/tube T is still firmly encompassed and propped by adapted accessory latching clip 70 because the minimal width of incurved toe gap H2 of the incurved toe gap 72 is less than the outer diameter d7 of the water pipe/tube T (FIG. 37) so that the sealing O-ring 20 is no more suffered from uneven stress from the water pipe/tube T. Thereby, without uneven stress from the water pipe/tube T, the original symmetrically isometric deformation 22 (FIG. 15-a) of the sealing O-ring 20 will be remained as shown in the associated partially magnified view of FIG. 36. Therefore, no matter which way of the water pipe/tube T bent caused by the orientation of bending force Fc, under the encompassing and propping effect of the adapted accessory latching clip 70, the even closely sealing effect of the sealing O-ring 20 over the outer wall of the water pipe/tube T is unaffected.

Figure 38:
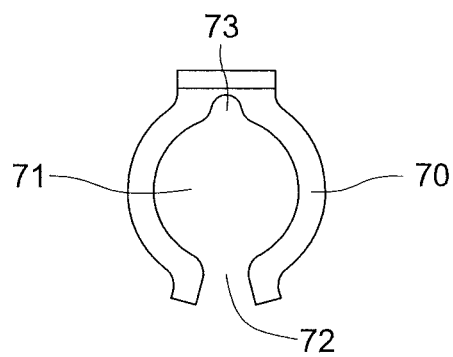
FIG. 38 is another front view for showing a further adapted accessory latching clip in the second preferred exemplary embodiment of the present invention.

Please refer to FIG. 38, which shows a further adapted accessory latching clip in the second preferred exemplary embodiment of the present invention. Here, a central groin notch 73 is further created at the inner bottom of the adapted U-shaped nick 71 in the adapted accessory latching clip 70 so that the operational convenience can be enhanced because the additional central groin notch 73 can reduce the tension from the pair incurved toes of the incurved toe gap 72.

In conclusion of all disclosures heretofore, either a novel gadget of adapted cylindrical elastic sleeving collet 60 or another contraption of adapted accessory latching clip 70 including an adapted U-shaped nick 71 with two prong of curved legs encompassing the central nick is cleverly applied in the present invention to solve serious leakage drawback in the water tube/pipe fittings of inserting type. The present invention meets the criterion of patentability because it has industrial applicability in addition to the novelty for the popular tube/pipe fittings of inserting type. Therefore, we submit the patent application for the present invention in accordance with related patent laws.

What is claimed is:

1. A leakage-proof pipe fitting of quick connection for a Reverse Osmosis Membrane (RO) water treatment unit for a household comprises a pipe fitting, a sealing O-ring, an annular cooperative bushing collar, an adapted cylindrical elastic sleeving collet and an accessory latching clip with a cantilevered lug, wherein:

said pipe fitting is unitarily extruded in one piece by plastics molding into a tubular L-shaped fitting with two coupling unions, wherein said pipe fitting includes a hollow water passage, a cylindrical retainer and a cylindrical docking receptacle, such that one coupling union encloses the cylindrical retainer therein, the cylindrical docking receptacle runs through the cylindrical retainer in communication with the hollow water passage, and an inner diameter of the cylindrical retainer is greater than an aperture of the cylindrical docking receptacle;

said sealing O-ring comprises rubber and is inserted against an inner bottom wall of the cylindrical retainer in the pipe fitting such that an outer diameter of the O-ring is equivalent to or greater than an inner diameter of the cylindrical retainer in the pipe fitting, and an inner diameter of the O-ring is less than an inner diameter of the cylindrical docking receptacle in the pipe fitting;

said annular cooperative bushing collar is unitarily extruded in one piece by plastics molding into a two-stair tiered hollow cylinder and is partially slidably inserted into the coupling union on the cylindrical retainer of the pipe fitting by means of a glue-bonding or high frequency melt-bonding method, wherein said annular cooperative bushing collar includes a top surface, a bottom surface, a jointing circular through-hole running through the top surface and the bottom surface, and a guiding conical flare respectively formed along each rim of the top surface and the bottom surface such that an outer diameter of a top stair rim abutting the top surface is greater than an outer diameter of a bottom stair rim abutting the bottom surface;

said adapted cylindrical elastic sleeving collet is unitarily extruded in one piece by plastics molding into a hollow cylinder and is slidably inserted into the jointing circular through-hole of the annular cooperative bushing collar, wherein said adapted cylindrical elastic sleeving collet includes a peripheral gorgerin integrating a top surface and a bottom surface with a circular sliding through hole running therethrough, an annular cambered locking flange abutting the bottom surface and an elongated annular delimiting flange abutting the top surface as well as a plurality of circumferentially equivalent spaced apart longitudinal hooping slits formed along the bottom surface and extending towards the top surface, and a plurality of circumferentially equivalent spaced apart elastic gripping ribs each formed between two adjacent longitudinal hooping slits, such that an outer diameter of the peripheral gorgerin is smaller than an inner diameter of the jointing circular through-hole in the annular cooperative bushing collar, an outer diameter of the annular cambered locking flange is greater than an inner diameter of the jointing circular through-hole in the annular cooperative bushing collar, and an outer diameter of the elongated annular delimiting flange is greater than an inner diameter of the annular cambered locking flange; wherein a longitudinal thickness of the elongated annular delimiting flange extends as part of an embracing distance from the top surface of the adapted cylindrical elastic sleeving collet to the bottom surface of the cylindrical retainer in the pipe fitting for reducing a curvature of a bent water pipe/tube covered by the embracing distance so that the sealing O-ring does not suffer from uneven stress from the bent water pipe/tube; and said accessory latching clip is unitarily extruded in one piece by plastics molding into a planiform collar and includes a U-shaped nick with two prongs of appendix legs encompassing a central cut nick such that a width between the two legs of the U-shaped nick is greater than the outer diameter of the peripheral gorgerin in the cylindrical elastic sleeving collet, such that the accessory latching clip serves as a clamping means for the assembled pipe fitting.

2. The leakage-proof pipe fitting of claim 1, wherein the longitudinal thickness of the elongated annular delimiting flange is greater than a longitudinal thickness of the peripheral gorgerin.

3. A leakage-proof pipe fitting of quick connection for a Reverse Osmosis Membrane (RO) water treatment unit for a household comprises a pipe fitting, a sealing O-ring, an annular cooperative bushing collar, a cylindrical elastic sleeving collet and an adapted accessory latching clip with a cantilevered lug, wherein:

said pipe fitting is unitarily extruded in one piece by plastics molding into a tubular L-shaped fitting with two coupling unions, wherein said pipe fitting includes a hollow water passage, a cylindrical retainer and a cylindrical docking receptacle, such that one coupling union encloses the cylindrical retainer therein, the cylindrical docking receptacle runs through the cylindrical retainer in communication with the hollow water passage, and an inner diameter of the cylindrical retainer is greater than an aperture of the cylindrical docking receptacle;

said sealing O-ring comprises rubber and is inserted against an inner bottom wall of the cylindrical retainer in the pipe fitting such that an outer diameter of the O-ring is equivalent to or greater than an inner diameter of the cylindrical retainer in the pipe fitting, and an inner diameter of the O-ring is less than the inner diameter of the cylindrical docking receptacle in the pipe fitting;

said annular cooperative bushing collar is unitarily extruded in one piece by plastics molding into a two-stair tiered hollow cylinder and is partially slidably inserted into the coupling union on the cylindrical retainer of the pipe fitting by means of a glue-bonding or high frequency melt-bonding method, wherein said annular cooperative bushing collar includes a top surface, a bottom surface, a jointing circular through-hole running through the top surface and the bottom surface, and a guiding conical flare respectively created along each rim of the top surface and the bottom surface such that the outer diameter of a top stair rim abutting the top surface is greater than an outer diameter of a bottom stair rim abutting the bottom surface;

said cylindrical elastic sleeving collet is unitarily extruded in one piece by plastics molding into a hollow cylinder and is slidably inserted into the jointing circular through-hole of the annular cooperative bushing collar, wherein said cylindrical elastic sleeving collet includes a peripheral gorgerin integrating a top surface and a bottom surface with a circular sliding through hole running therethrough, an annular cambered locking flange abutting the bottom surface and an annular delimiting flange abutting the top surface as well as a plurality of circumferentially equivalent spaced apart longitudinal hooping slits formed along the bottom surface and extending towards the top surface in communication with the circular sliding through hole, and a plurality of circumferentially equivalent spaced apart elastic gripping ribs each formed between two adjacent longitudinal hooping slits, such that an outer diameter of the peripheral gorgerin is smaller than an inner diameter of the jointing circular through-hole in the annular cooperative bushing collar, an outer diameter of the annular cambered locking flange is greater than an inner diameter of the jointing circular through-hole in the annular cooperative bushing collar, and an outer diameter of the annular delimiting flange is greater than an inner diameter of the annular cambered locking flange; and said adapted accessory latching clip is unitarily extruded in one piece by plastics molding into a planiform collar and includes an adapted U-shaped nick having two prongs of curved legs encompassing a central nick, the two prongs of curved legs forming an outcurved knee bulge configured by two outcurved knees having a maximal width and an incurved toe gap configured by two incurved toes having a minimal width, wherein the minimal width is less than the outer diameter of the peripheral gorgerin in the cylindrical elastic sleeving collet.

4. The leakage-proof pipe fitting of claim 3, wherein said adapted accessory latching clip is made of a metal material by a latching process or a casting process.

* * * * *